US012664620B2

(12) United States Patent
Suthar et al.

(10) Patent No.: US 12,664,620 B2
(45) Date of Patent: Jun. 23, 2026

(54) MULTI-FRAME LIKELIHOOD-BASED ADAPTIVE BAD PIXEL CORRECTION IN IMAGE PROCESSING APPLICATIONS OR OTHER APPLICATIONS

(71) Applicant: Samsung Electronics Co., Ltd., Suwon-si (KR)

(72) Inventors: Madhuri Suthar, Frisco, TX (US); Nguyen Thang Long Le, Garland, TX (US); Tyler Luu, Richardson, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 18/480,829

(22) Filed: Oct. 4, 2023

(65) Prior Publication Data

US 2025/0117894 A1 Apr. 10, 2025

(51) Int. Cl.
*G06T 5/70* (2024.01)

(52) U.S. Cl.
CPC ...... *G06T 5/70* (2024.01); *G06T 2207/10024* (2013.01); *G06T 2207/20004* (2013.01)

(58) Field of Classification Search
CPC ............. G06T 5/70; G06T 2207/10024; G06T 2207/20004; G06T 5/73; G06T 2207/20024; G06T 2207/20182; G06T 2207/10004; G06T 2207/10016; G06T 5/60; G06T 2207/30168; G06T 5/77; G06T 7/0002; G06V 10/30; H04N 9/646; H04N 5/21; H04N 5/213; H04N 25/68; H04N 25/61; H04N 25/67; H04N 25/671;
(Continued)

(56) References Cited

U.S. PATENT DOCUMENTS

| | | | |
|---|---|---|---|
| 7,034,874 | B1 | 4/2006 | Reinhart et al. |
| 8,913,163 | B2 | 12/2014 | Seo |
| 9,432,601 | B2 | 8/2016 | Sei |

(Continued)

FOREIGN PATENT DOCUMENTS

| | | |
|---|---|---|
| CN | 115797325 A | 3/2023 |
| EP | 3706404 A1 | 9/2020 |

(Continued)

OTHER PUBLICATIONS

International Search Report and Written Opinion of the International Searching Authority dated Oct. 11, 2024 in connection with International Patent Application No. PCT/KR2024/009068, 8 pages.

*Primary Examiner* — Jose L Couso

(57) ABSTRACT

A method includes obtaining multiple input image frames and generating bad pixel maps associated with different ones of the input image frames. Each bad pixel map is generated using first and second adaptive thresholds that are based on statistical properties of image data contained in a specified operation window within the associated input image frame. The method also includes generating at least one refined bad pixel map using the bad pixel maps associated with two or more of the input image frames. The method further includes using one or more coordinates of one or more bad pixels identified in the at least one refined bad pixel map to update one or more pixel values of at least one of the input image frames.

20 Claims, 11 Drawing Sheets

(58) Field of Classification Search
CPC .... H04N 25/683; H04N 25/84; H04N 25/843;
G02B 27/0025
See application file for complete search history.

(56) References Cited

U.S. PATENT DOCUMENTS

| | | | | |
|---|---|---|---|---|
| 10,554,914 B1 * | 2/2020 | Lin | ........................ | H04N 25/68 |
| 10,951,843 B2 | 3/2021 | Lin et al. | | |
| 2003/0179418 A1 | 9/2003 | Wengender et al. | | |
| 2010/0141807 A1 | 6/2010 | Alon et al. | | |
| 2011/0298933 A1 * | 12/2011 | Yanowitz | ............... | H04N 25/61 |
| | | | | 348/E17.002 |
| 2013/0022258 A1 | 1/2013 | Lee et al. | | |
| 2014/0270562 A1 * | 9/2014 | Neal | ........................ | G06T 5/50 |
| | | | | 382/254 |
| 2014/0270568 A1 * | 9/2014 | Hutchison | ................. | G06T 5/50 |
| | | | | 382/264 |
| 2015/0315489 A1 * | 11/2015 | Hanks | ................... | C10G 53/02 |
| | | | | 208/100 |
| 2016/0247264 A1 * | 8/2016 | Neal | ........................ | G06T 5/70 |
| 2020/0221007 A1 | 7/2020 | Kenjo | | |

FOREIGN PATENT DOCUMENTS

| | | | |
|---|---|---|---|
| JP | 2009-130553 A | 6/2009 | |
| JP | 2017-208604 A | 11/2017 | |
| WO | 2022204256 A1 | 9/2022 | |
| WO | 2023190644 A1 | 10/2023 | |

* cited by examiner

FIG. 13A
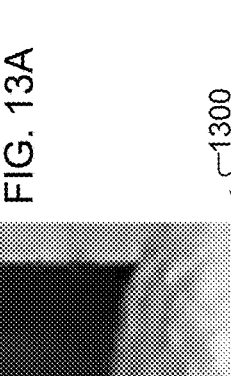
1300
1302
FIG. 13B

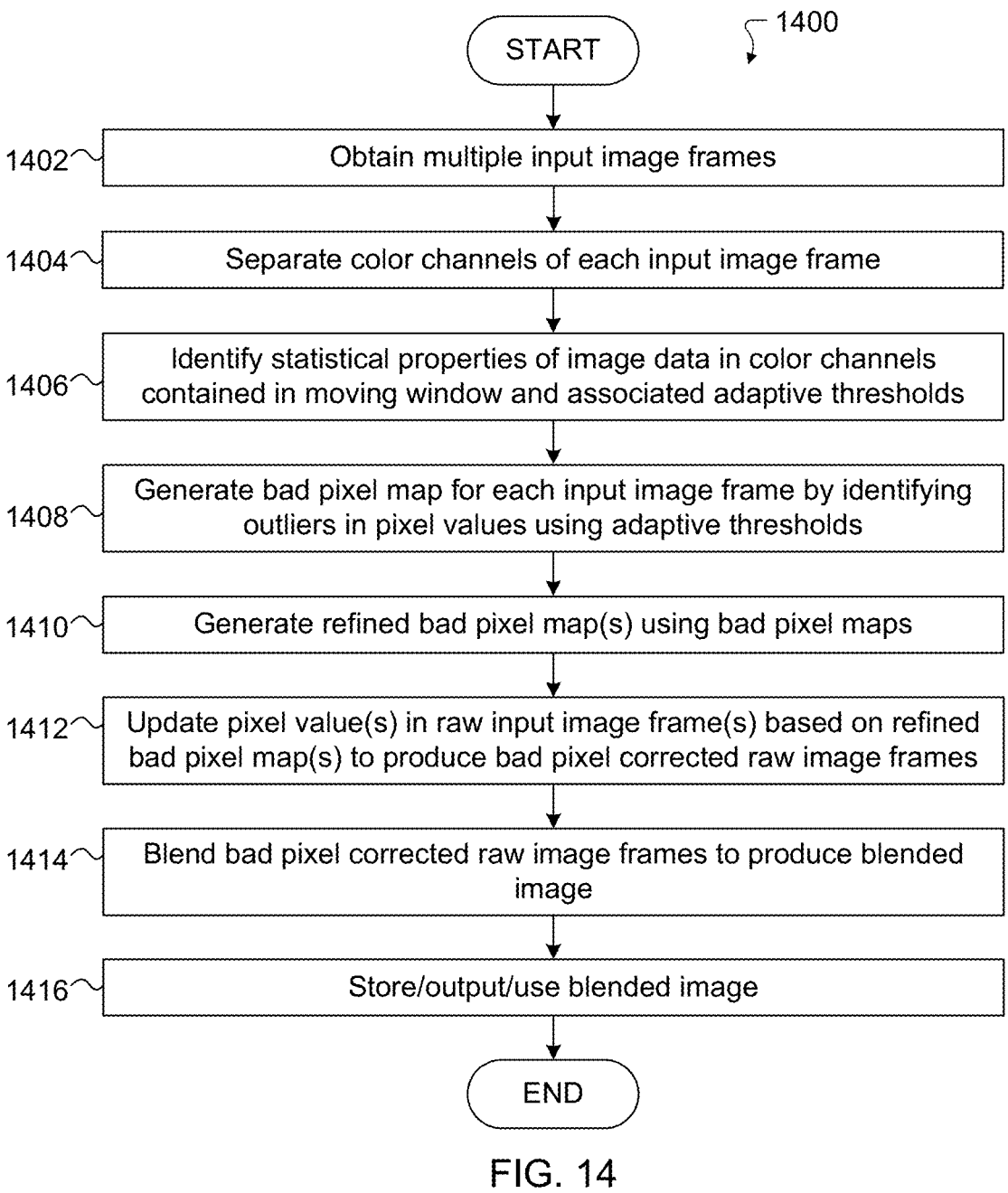

1400

START

1402 — Obtain multiple input image frames

1404 — Separate color channels of each input image frame

1406 — Identify statistical properties of image data in color channels contained in moving window and associated adaptive thresholds 1408 — Generate bad pixel map for each input image frame by identifying outliers in pixel values using adaptive thresholds 1410 — Generate refined bad pixel map(s) using bad pixel maps 1412 — Update pixel value(s) in raw input image frame(s) based on refined bad pixel map(s) to produce bad pixel corrected raw image frames 1414 — Blend bad pixel corrected raw image frames to produce blended image 1416 — Store/output/use blended image

END

FIG. 14

MULTI-FRAME LIKELIHOOD-BASED ADAPTIVE BAD PIXEL CORRECTION IN IMAGE PROCESSING APPLICATIONS OR OTHER APPLICATIONS

TECHNICAL FIELD

This disclosure relates generally to imaging systems. More specifically, this disclosure relates to multi-frame likelihood-based adaptive bad pixel correction in image processing applications or other applications.

BACKGROUND

Many mobile electronic devices, such as smartphones and tablet computers, include cameras that can be used to capture still and video images. While convenient, cameras on mobile electronic devices typically suffer from a number of shortcomings. For example, it is routine for a small number of pixels in any digital camera sensor to be defective, such as due to manufacturing imperfections or age/use. The locations of defective pixels tend to be highly unpredictable, and defective pixels can produce undesired artifacts in final images of scenes. These artifacts can be very noticeable to human observers, such as when the artifacts appear in very dark or very bright portions of images, thereby leading to poor user experiences.

SUMMARY

This disclosure relates to multi-frame likelihood-based adaptive bad pixel correction in image processing applications or other applications.

In a first embodiment, a method includes obtaining multiple input image frames and generating bad pixel maps associated with different ones of the input image frames. Each bad pixel map is generated using first and second adaptive thresholds that are based on statistical properties of image data contained in a specified operation window within the associated input image frame. The method also includes generating at least one refined bad pixel map using the bad pixel maps associated with two or more of the input image frames. The method further includes using one or more coordinates of one or more bad pixels identified in the at least one refined bad pixel map to update one or more pixel values of at least one of the input image frames.

In a second embodiment, an electronic device includes at least one imaging sensor configured to capture multiple input image frames. The electronic device also includes at least one processing device configured to generate bad pixel maps associated with different ones of the input image frames. To generate each bad pixel map, the at least one processing device is configured to use first and second adaptive thresholds that are based on statistical properties of image data contained in a specified operation window within the associated input image frame. The at least one processing device is also configured to generate at least one refined bad pixel map using the bad pixel maps associated with two or more of the input image frames. The at least one processing device is further configured to use one or more coordinates of one or more bad pixels identified in the at least one refined bad pixel map to update one or more pixel values of at least one of the input image frames.

In a third embodiment, a non-transitory machine readable medium contains instructions that when executed cause at least one processor to obtain multiple input image frames and generate bad pixel maps associated with different ones of the input image frames. The instructions that when executed cause the at least one processor to generate the bad pixel maps include instructions that when executed cause the at least one processor to generate each bad pixel map using first and second adaptive thresholds that are based on statistical properties of image data contained in a specified operation window within the associated input image frame. The non-transitory machine readable medium also contains instructions that when executed cause the at least one processor to generate at least one refined bad pixel map using the bad pixel maps associated with two or more of the input image frames. The non-transitory machine readable medium further contains instructions that when executed cause the at least one processor to use one or more coordinates of one or more bad pixels identified in the at least one refined bad pixel map to update one or more pixel values of at least one of the input image frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description, taken in conjunction with the accompanying drawings, in which:

FIGS. 13A and 13B illustrate example results that may be obtained using multi-frame likelihood-based adaptive bad pixel correction in image processing applications or other applications in accordance with this disclosure; and FIG. 14 illustrates an example method for multi-frame likelihood-based adaptive bad pixel correction in image processing applications or other applications in accordance with this disclosure.

DETAILED DESCRIPTION

Figure 1:
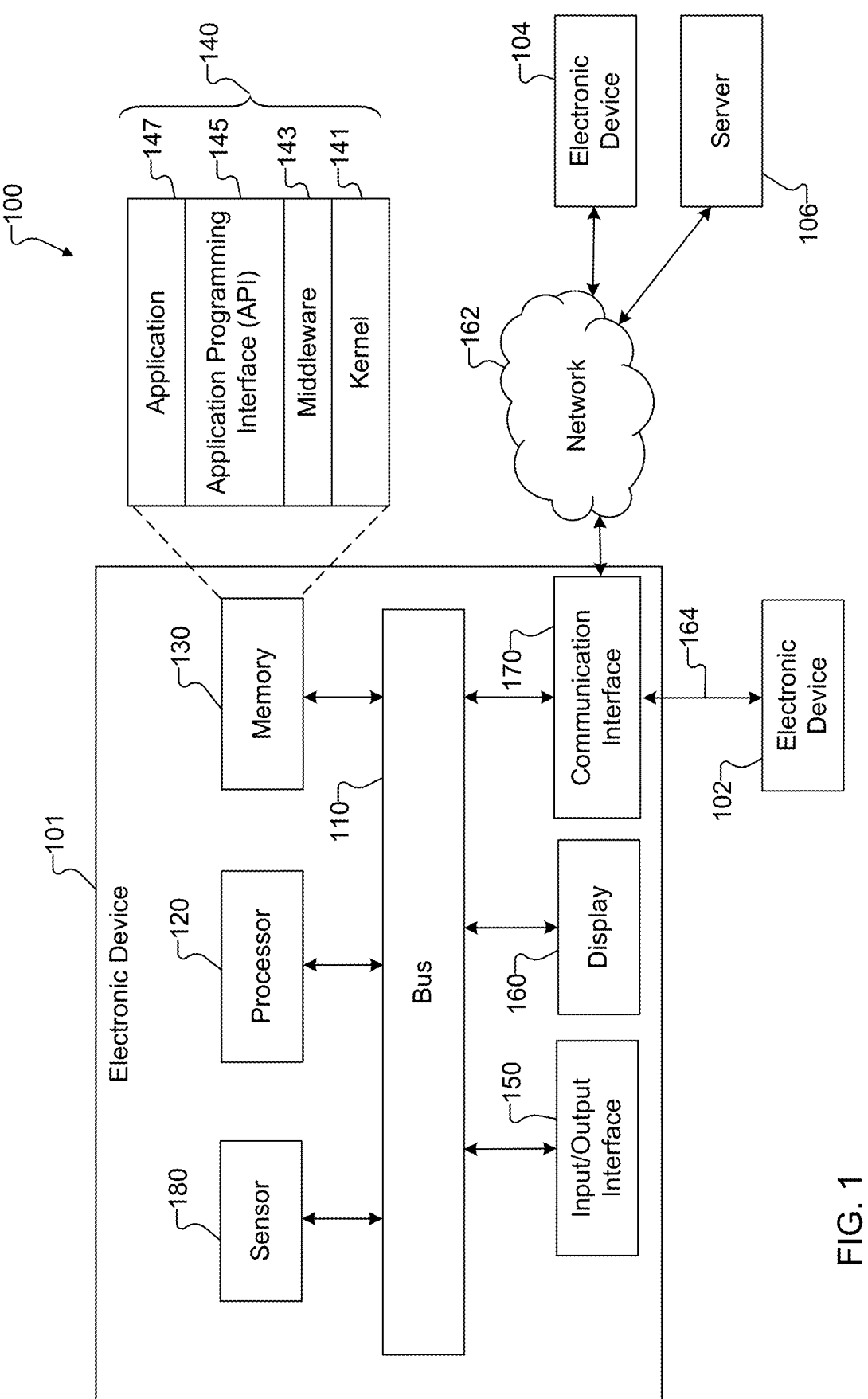
FIG. 1 illustrates an example network configuration including an electronic device in accordance with this disclosure.

FIGS. 1 through 14, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. While convenient, cameras on mobile electronic devices typically suffer from a number of shortcomings. For example, it is routine for a small number of pixels in any digital camera sensor to be defective, such as due to manufacturing imperfections or age/use. The locations of defective pixels tend to be highly unpredictable, and defective pixels can produce undesired artifacts in final images of scenes. These artifacts can be very noticeable to human observers, such as when the artifacts appear in very dark or very bright portions of images, thereby leading to poor user experiences.

Some higher-end imaging systems can undergo complex camera sensor calibrations during their manufacturing processes in order to identify defective pixels and implement hardware-based pixel corrections. However, complex camera sensor calibration processes are generally impractical for mass-produced smartphones, tablet computers, or other devices due to the complexity and time required for the calibrations. Also, these sensor calibration processes cannot help after imaging systems are placed into operation, at which point pixels of the imaging systems can fail over time due to age, use, or other factors. Other approaches can apply filters to identify bad pixels in given image data by exploiting computed anomalies associated with pixels and their neighboring pixels. However, these filters typically result in texture blurs and detail losses in darker image areas, which (among other reasons) can be caused by the filtering/removal of data from pixels that are not actually bad pixels.

That is, these filters can generate false alarms and identify functional pixels as being bad, which can result in the removal of valid pixel data from images. Conversely, these filters can also miss various pixels that are actually bad, which allows image data from the bad pixels to remain in images.

This disclosure provides various techniques for multi-frame likelihood-based adaptive bad pixel correction in image processing applications or other applications. As described in more detail below, multiple input image frames of a scene can be obtained, such as when two or more input image frames are captured by one or more imaging sensors (possibly under different capture conditions like different ISO values or exposure settings and/or different contents in a scene being imaged). Bad pixel maps associated with different ones of the input image frames can be generated, and each bad pixel map can be generated using first and second adaptive thresholds that are based on statistical properties of image data contained in a specified operation window within the associated input image frame. At least one refined bad pixel map can be generated using the bad pixel maps associated with two or more of the input image frames. Various approaches for generating the refined bad pixel map(s) using the bad pixel maps are described below. The refined bad pixel map(s) can be used to update one or more pixel values in at least one of the input image frames, such as when one or more coordinates of one or more bad pixels are identified in the refined bad pixel map(s) and the pixel value(s) of the pixel(s) at the coordinate(s) in one or more of the input image frames are updated. The input image frames (including those with updated pixel data) may be blended or otherwise processed to produce a blended image, which can be post-processed (if needed or desired) or otherwise used to produce a final image of the scene.

In this way, the disclosed techniques can be used to quickly identify pixels of an imaging sensor that are likely faulty, such as due to manufacturing, age, use, or other issues. Also, these techniques can be customized for multi-frame processing architectures by utilizing individual frame exposure information or other capture condition information during the identification of bad pixels. Since different input image frames can contribute differently to final images of scenes produced using multi-frame processing, the disclosed techniques can help to support unique processing of different input image frames based on their different ISO values, exposure times, image contents, or other capture conditions. Moreover, the disclosed techniques can combine bad pixel information determined using multiple input image frames, which may be based on the assumption that bad pixels cannot move and identifying bad pixels across multiple input image frames can improve bad pixel detection accuracy. Further, the disclosed techniques can identify bad pixels using likelihood-based adaptive thresholds, which can support bad pixel detection in the presence of varying image capture conditions. In addition, the disclosed techniques can be used to generate final images of scenes having improved quality, such as improved textures, by reducing or minimizing the number of pixels whose data is replaced during bad pixel correction.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to obtain multiple input image frames and to perform multi-frame likelihood-based adaptive bad pixel correction. The processor 120 may also be used to blend or otherwise combine the input image frames (as modified based on the bad pixel correction) in order to produce blended images of scenes.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for performing multi-frame likelihood-based adaptive bad pixel correction. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to obtain multiple input image frames and to perform multi-frame likelihood-based adaptive bad pixel correction. The server 106 may also be used to blend or otherwise combine the input image frames (as modified based on the bad pixel correction) in order to produce blended images of scenes.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
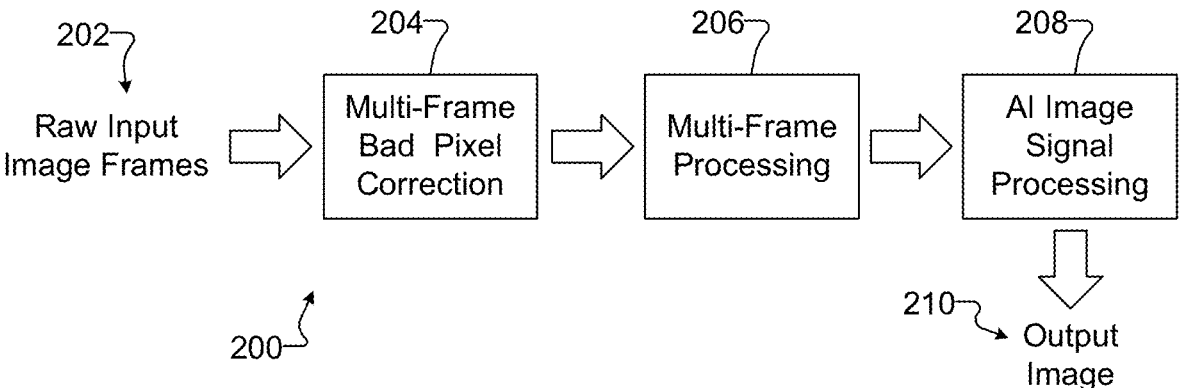
FIG. 2 illustrates an example architecture supporting multi-frame likelihood-based adaptive bad pixel correction in image processing applications or other applications in accordance with this disclosure.

FIG. 2 illustrates an example architecture 200 supporting multi-frame likelihood-based adaptive bad pixel correction in image processing applications or other applications in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 generally receives and processes raw input image frames 202. The raw input image frames 202 may be obtained from any suitable source(s), such as when the raw input image frames 202 are produced by at least one camera or other imaging sensor 180 of the electronic device 101 during an image capture operation. Raw image frames typically refer to image frames that have undergone little if any processing after being captured. The availability of raw image frames can be useful in a number of circumstances since the raw image frames can be subsequently processed to achieve the creation of desired effects in output images. In many cases, for example, the raw input image frames 202 can have a wider dynamic range or a wider color gamut that is narrowed during image processing operations in order to produce still or video images suitable for display or other use.

The raw input image frames 202 may include two or more image frames captured using different capture conditions. The capture conditions can represent any suitable settings of the electronic device 101 or other device used to capture the raw input image frames 202 or any suitable contents of scenes being imaged. For example, the capture conditions may represent different exposure settings of the imaging sensor(s) 180 used to capture the raw input image frames 202, such as different exposure times or ISO settings. In multi-frame processing pipelines, for instance, multiple raw input image frames 202 can be captured using different exposure settings so that portions of different raw input image frames 202 can be combined to produce a high dynamic range (HDR) output image or other blended image. The multiple raw input image frames 202 can also have different image contents when capturing dynamic scenes.

The raw input image frames 202 are processed using a multi-frame bad pixel correction (BPC) operation 204, which processes the raw input image frames 202 in order to identify faulty or otherwise bad pixels in the imaging sensor(s) 180 used to capture the raw input image frames 202. For example, the multi-frame bad pixel correction operation 204 can generate bad pixel maps associated with different raw input image frames 202. In some cases, for instance, this can be done by generating initial bad pixel maps for different color channels of each raw input image frame 202 and combining the initial bad pixel maps to generate a bad pixel map for that input image frame 202. In general, each raw input image frame 202 may include image data associated with different color channels, such as when each raw input image frame 202 represents a Bayer image. A Bayer image represents an image captured using a Bayer color filter array, where approximately twice as many green pixel values are produced as red or blue pixel values (which corresponds more closely to the actual physiology of the human eye). In these embodiments, each raw input image frame 202 may be separated into a red color channel image, a blue color channel image, and two green color channel images, and initial bad pixel maps may be generated using these color channels and combined. Note, however, that other types of color filter arrays may optionally be used with the architecture 200, such as a red-green-blue-white (RGBW) color filter array, which can alter which color channel images are generated here. In other cases, this can be done by generating the bad pixel map for each input image frame 202 based on aggregated statistical properties for the various color channels of the input image frames 202 without first generating initial bad pixel maps.

In whatever manner the individual bad pixel maps for the input image frames 202 are generated, the multi-frame bad pixel correction operation 204 can combine the bad pixel maps for multiple ones of the raw input image frames 202 in order to produce at least one refined bad pixel map. Since the refined bad pixel map or maps are based on multiple bad pixel maps for multiple input image frames 202, the refined bad pixel map(s) should be at least as accurate as, and ideally more accurate than, the individual bad pixel maps. Once the refined bad pixel map or maps are produced, the multi-frame bad pixel correction operation 204 can modify one or more of the raw input image frames 202 in order to compensate for at least some of the bad pixels identified in the refined bad pixel map(s). For example, the refined bad pixel map(s) may identify one or more coordinates of one or more bad pixels associated with the raw input image frames 202, where the one or more pixels at the one or more coordinates are identified as providing invalid or faulty pixel data. The multi-frame bad pixel correction operation 204 can therefore operate to replace the pixel value at each of the identified coordinates, such as by averaging neighboring pixel values in a vicinity around each bad pixel location, generating a weighted combination of neighboring pixel values in a vicinity around each bad pixel location, or replacing a pixel value from a bad pixel with a pixel value from a neighboring pixel in a vicinity around each bad pixel location. Effectively, this process masks the presence of pixel data from the bad pixel(s) in the raw input image frames 202, thereby helping to reduce or minimize the appearance of artifacts in the raw input image frames 202.

The multi-frame bad pixel correction operation 204 can include any suitable logic used to identify bad pixels based on multiple input image frames and to compensate for the presence of pixel values from the bad pixels in the input image frames. Example implementations of the multi-frame bad pixel correction operation 204 are shown in FIGS. 7 through 11, which are described below. The multi-frame bad pixel correction operation 204 here is said to process the raw input image frames 202 and produce bad pixel corrected raw image frames.

Figure 12:
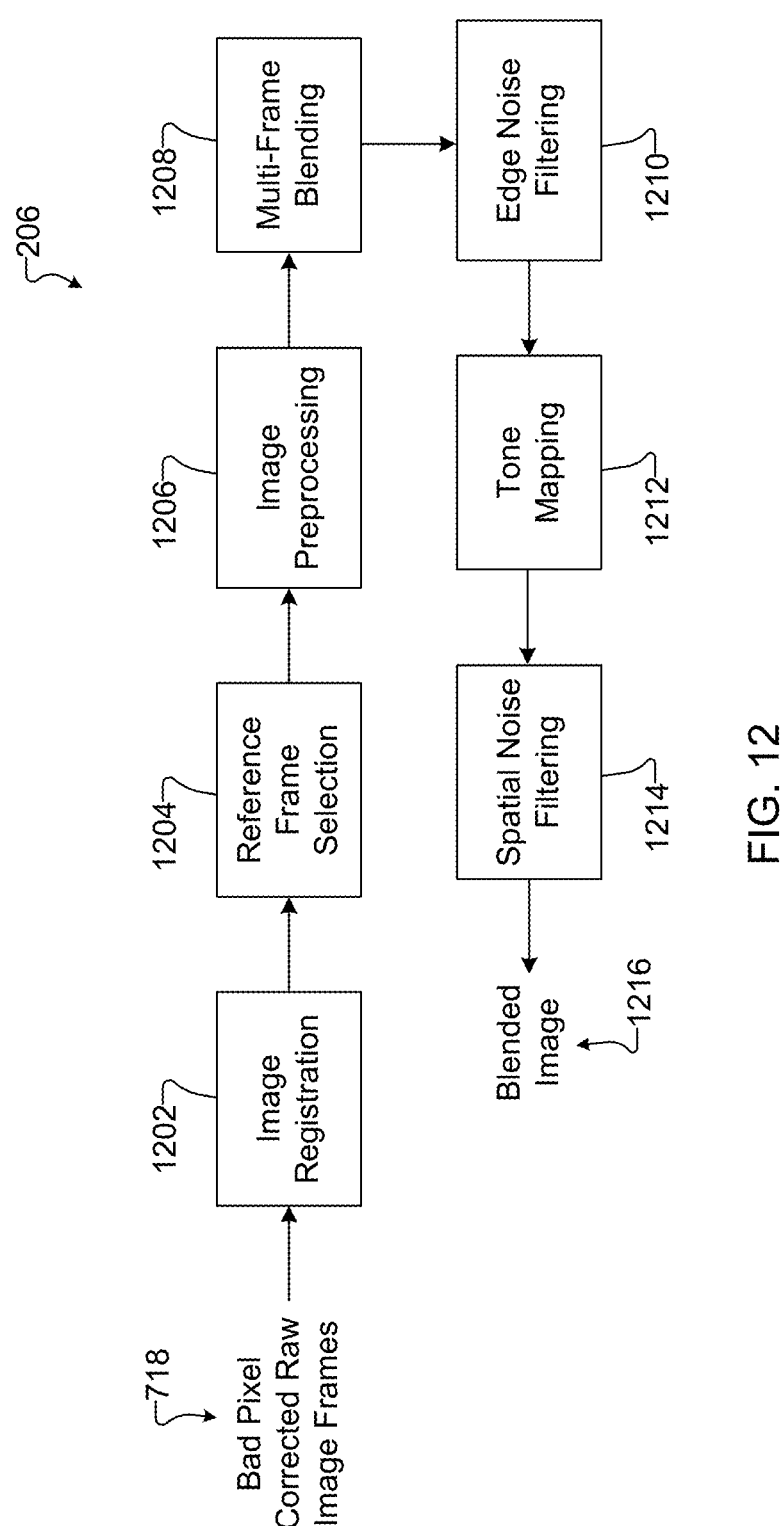
FIG. 12 illustrates an example multi-frame processing operation in the architecture of FIG. 2 in accordance with this disclosure.

The bad pixel corrected raw image frames from the multi-frame bad pixel correction operation 204 are provided to a multi-frame processing (MFP) operation 206, which generally operates to blend or otherwise combine the bad pixel corrected raw image frames. For example, the multi-frame processing operation 206 can process the bad pixel corrected raw image frames in order to determine how the bad pixel corrected raw image frames can be blended to produce one or more blended images. The blended images may represent HDR images or other images that have improved characteristics relative to the individual bad pixel corrected raw image frames. The multi-frame processing operation 206 can include any suitable logic used to blend or otherwise combine multiple image frames. One example implementation of the multi-frame processing operation 206 is shown in FIG. 12, which is described below. The multi-frame processing operation 206 here is said to process the bad pixel corrected raw image frames and produce blended images.

The blended images from the multi-frame processing operation 206 may optionally be provided to an artificial intelligence (AI) image signal processing (ISP) operation 208, which may generally use one or more trained machine learning models or other logic to process the blended images and produce output images 210. For example, the image signal processing operation 208 may use one or more trained machine learning models to perform image sharpening, blur reduction, color enhancement, or any other desired post-processing operation(s) involving the blended images from the multi-frame processing operation 206. The image signal processing operation 208 can include any suitable logic used to improve the quality of blended images or to provide other modifications to blended images. Note that while the image signal processing operation 208 is described here as being machine learning model-based, the image signal processing operation 208 may be implemented in any other suitable manner. Also, some or all of the functions performed by the image signal processing operation 208 may be implemented in the multi-frame processing operation 206.

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor 120 of the electronic device 101, server 106, or other device(s). In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of an architecture 200 supporting multi-frame likelihood-based adaptive bad pixel correction in image processing applications or other applications, various changes may be made to FIG. 2. For example, various components and functions in FIG. 2 may be combined, further subdivided, replicated, or rearranged according to particular needs. Also, one or more additional components and functions may be included if needed or desired. In addition, raw input image frames 202 may be subjected to any desired pre-processing operation(s) prior to processing by the multi-frame bad pixel correction operation 204, and blended images may be subjected to any desired post-processing operation(s) prior to generation of output images 210.

FIGS. 3 through 6 illustrate example likelihood-based adaptive thresholds for use during multi-frame likelihood-based adaptive bad pixel correction in accordance with this disclosure. The likelihood-based adaptive thresholds may be used by the multi-frame bad pixel correction operation 204 when determining whether pixel values in the input image frames 202 are associated with bad pixels. For example, the multi-frame bad pixel correction operation 204 can use the adaptive thresholds in order to identify any outliers in the pixel data contained in each input image frame 202 or in each color channel of each input image frame 202. These outliers can be processed in order to determine whether the pixels associated with those outliers are bad pixels.

In some embodiments, the multi-frame bad pixel correction operation 204 can define an operation window (also known as a kernel) and analyze pixel data in each input image frame 202 or in each color channel thereof falling within the operation window. In some cases, the window size of the operation window can be different for different color channels or different input image frames 202, such as when the window size of the operation window varies based on the capture condition(s) associated with the corresponding input image frame 202. As a particular example, the window size of the operation window can be smaller (such as when a 5×5 window size is used) when a raw input image frame 202 is captured using a lower ISO value or shorter exposure time, which can help to limit noise in the corresponding output image 210. The window size of the operation window can be larger when a raw input image frame 202 is captured using a higher ISO value or longer exposure time. Note that the operation window can also depend on the contents in the input image frames 202 or their color channels, such as when the operation window is larger for spatially-flat areas in an image and smaller for spatially-varying areas in the image to preserve details.

The multi-frame bad pixel correction operation 204 can move the operation window within each input image frame 202 or within each color channel of each input image frame 202, such as by sliding the operation window left/right and up/down, in order to process different collections of pixel data within each input image frame 202 or color channel and identify outliers potentially representing bad pixels in the pixel data. In other words, the multi-frame bad pixel correction operation 204 can process neighborhoods of pixel data in each input image frame 202 or each color channel in order to identify the outliers in the pixel data. For example, the multi-frame bad pixel correction operation 204 can identify a distribution of the pixel values contained in the operation window for each position of the operation window within each input image frame 202 or within each color channel of each input image frame 202. In some instances, each distribution can be based on the intensities of the pixel values contained in the operation window for each position of the operation window. Note that the multi-frame bad pixel correction operation 204 can also compare pixel values in the operation window across different color channels of the same input image frame 202, such as in addition to comparing the pixel values in the operation window within a single color channel of an input image frame 202.

Defective "hot" pixels refer to pixels whose outputs are significantly higher than they should be, and defective "bright" pixels refer to pixels whose outputs are slightly higher than they should be. These types of bad pixels can be identified by the multi-frame bad pixel correction operation 204 determining a first maximum (the highest value of pixel intensities within the operation window) and an $N^{th}$ maximum (the $N^{th}$ highest value of the pixel intensities within the operation window). In some cases, N here may represent two, three, or four. Defective "dark" pixels refer to pixels whose outputs are less than they should be. This type of bad pixel can be identified by the multi-frame bad pixel correction operation 204 determining a first minimum (the smallest value of the pixel intensities within the operation window) and an $N^{th}$ minimum (the $N^{th}$ smallest value of the pixel intensities within the operation window). Again, in some cases, N here may represent two, three, or four.

Based on these definitions of hot, bright, and dark pixels, the multi-frame bad pixel correction operation 204 can identify a bad pixel map identifying hot and bright pixels for each input image frame 202 or each color channel thereof.

In some cases, the contents of the hot/bright bad pixel map for each input image frame 202 can be determined as follows.

$$\text{Bright and Hot Pixels Map} = (I_{Max} - I_{NMax} > Th_{Max}) \,\&\, (I_{Img} > I_{NMax})$$

Here, $I_{Max}$ and $I_{NMax}$ respectively represent the first maximum intensity value and the $N^{th}$ maximum intensity value determined for each position of the operation window, $I_{Img}$ represents pixel values in an input image frame, and $Th_{Max}$ represents a maximum threshold value. The values of $I_{Max}$ and $I_{NMax}$ may typically be based on the exposure setting of the image frame being processed and contents in the scene being imaged. This approach is based on the assumption that, for any given position of the operation window within an input image frame 202, the pixel intensity distribution can have one or more outliers in the event of one or more bad pixels, where the one or more outliers deviate from the normal pixel value distribution. A hot or bright pixel can be isolated by comparing a difference between the maximum value (which would be equal to the hot or bright pixel's value) and the $N^{th}$ maximum value (which would be closer to the mean pixel distribution) within the operation window, and this is determined by ($I_{Max}$-$I_{NMax}$>$Th_{Max}$). Thus, when this difference is larger than the maximum threshold $Th_{Max}$, this indicates the presence of a bad (hot or bright) pixel. Moreover, false positives can be reduced by isolating only locations where the normal pixel value distribution is above a mean value, and this is determined by ($I_{Img}$>$I_{NMax}$). Essentially, the first comparison ($I_{Max}$-$I_{NMax}$>$Th_{Max}$) may be viewed as testing for the presence of a long-tailed distribution within the operation window, and the second comparison ($I_{Img}$>$I_{NMax}$) may be viewed as determining whether the center pixel in the operation window is an outlier within the long-tailed distribution. Note that while described here as being done using image data in an input image frame 202, the same or similar process can be done for each color channel of the input image frame 202.

Similarly, the multi-frame bad pixel correction operation 204 can identify a bad pixel map identifying dark pixels for each input image frame 202 or each color channel thereof. In some cases, the contents of the dark bad pixel map for each input image frame 202 can be determined as follows.

$$\text{Dark Pixels Map} = (I_{NMin} - I_{Min} > Th_{Min}) \,\&\, (I_{Img} < I_{NMin})$$

Here, $I_{Min}$ and $I_{NMm}$ respectively represent the first minimum intensity value and the $N^{th}$ minimum intensity value determined for each position of the operation window, and $Th_{Min}$ represents a minimum threshold value. The values of $I_{Min}$ and $I_{NMm}$ may typically be based on the exposure setting of the image frame being processed and contents in the scene being imaged. Again, this approach is based on the assumption that, for any given position of the operation window within an input image frame 202, the pixel intensity distribution can have one or more outliers in the event of one or more bad pixels, where the one or more outliers deviate from the normal pixel value distribution. A dark pixel can be isolated by comparing a difference between the minimum value (which would be equal to the dark pixel's value) and the $N^{th}$ minimum value (which would be closer to the mean pixel distribution) within the operation window, and this is determined by ($I_{NMin}$-$I_{Min}$>$Th_{Min}$). Thus, when this difference is larger than the minimum threshold $\text{Th}_{Min}$, this indicates the presence of a bad (dark) pixel. Moreover, false positives can be reduced by isolating only locations where the normal pixel value distribution is below the mean value, and this is determined by ($I_{Img} < I_{NMin}$). Essentially, the first comparison ($I_{NMin} - I_{Min} > \text{Th}_{Min}$) may be viewed as testing for the presence of a long-tailed distribution within the operation window, and the second comparison ($I_{Img} < I_{NMin}$) may be viewed as determining whether the center pixel in the operation window is an outlier within the long-tailed distribution. Again, note that while described here as being done using image data in an input image frame 202, the same or similar process can be done for each color channel of the input image frame 202.

In the description above, the thresholds $\text{Th}_{Max}$ and $\text{Th}_{Min}$ can be selected so as to reduce or potentially minimize false alarm detections and missed detections of bad pixels. False alarm detections generally occur when a pixel is identified as being bad even when the pixel is functioning correctly. Missed detections generally occur when a pixel is not identified as being bad even when the pixel is functioning incorrectly. The following now describes example techniques for adaptively determining values of the maximum and minimum thresholds $\text{Th}_{Max}$ and Thum based on the image contents in the input image frames 202 (or in their color channels).

Figure 3:
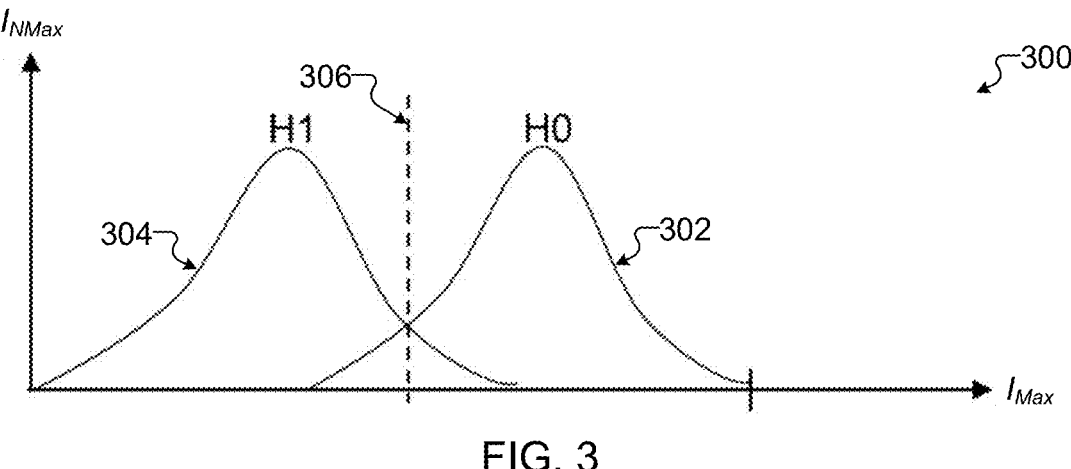
FIGS. 3 through 6 illustrate example likelihood-based adaptive thresholds for use during multi-frame likelihood-based adaptive bad pixel correction in accordance with this disclosure.
Figure 4:
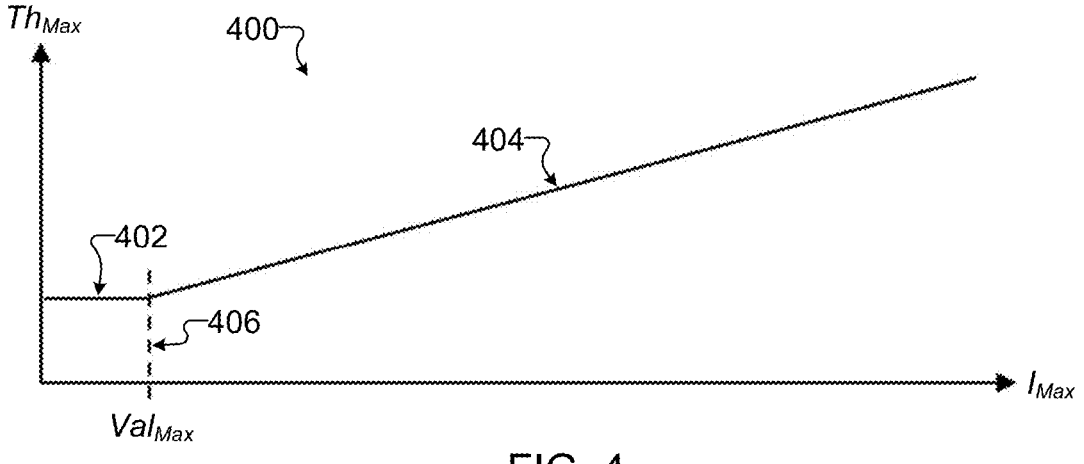

As shown in FIGS. 3 and 4, graphs 300 and 400 can be used to illustrate how the value of the maximum adaptive threshold $\text{Th}_{Max}$ can be selected. More specifically, the maximum adaptive threshold $\text{Th}_{Max}$ for use with an operation window can be based on the maximum intensity value $I_{Max}$ for the pixel values in the operation window. For a given maximum intensity value/Max, the following likelihood model for the $N^{th}$ maximum intensity value $I_{NMax}$ may be defined. Under a condition H0 (having no long-tailed distribution), the likelihood/distribution of the $N^{th}$ maximum intensity value $I_{NMax}$ can be Gaussian with a mean at or close to the maximum intensity value $I_{Max}$. This condition is illustrated in FIG. 3, where a curve 302 represents the likelihood/distribution of the $N^{th}$ maximum intensity value $I_{NMax}$ under condition H0. Under a condition H1 (having a long-tailed distribution), the likelihood/distribution of the $N^{th}$ maximum intensity value $I_{NMax}$ can be Gaussian with a mean farther from the maximum intensity value $I_{Max}$. This condition is illustrated in FIG. 3, where a curve 304 represents the likelihood/distribution of the $N^{th}$ maximum intensity value $I_{NMax}$ under condition H1. Given these assumptions, the optimal value for the maximum adaptive threshold $\text{Th}_{Max}$ (maximum in the a posteriori probability sense) can be given by the value where the likelihood ratio is the same as the prior ratio. This point is identified along a line 306 in FIG. 3, which is where the curves 302 and 304 intersect.

Based on this, the graph 400 can be generated, which identifies the maximum adaptive threshold $\text{Th}_{Max}$ for different maximum intensity values $I_{Max}$. Here, the maximum adaptive threshold $\text{Th}_{Max}$ can have a constant value for a first range 402 of image brightness values (intensity values/Max) and an increasing value for a second range 404 of image brightness values. The second range 404 is larger than the first range 402, meaning the second range 404 spans a larger range of image brightness values. This allows for the use of a larger maximum adaptive threshold $\text{Th}_{Max}$ in brighter areas of input image frames 202. Thus, the maximum adaptive threshold $\text{Th}_{Max}$ can be selected for use with any given input image frame 202 or color channel thereof based on the maximum intensity value/Max within the operation window of that input image frame 202 or color channel, namely by using that maximum intensity value/Max to select the corresponding maximum adaptive threshold $\text{Th}_{Max}$ within the graph 400. The selected value for the maximum adaptive threshold $\text{Th}_{Max}$ can be used to identify one or more hot or bright pixels that generate image data that is too bright relative to other pixels in the operation window. Note that the slope of the maximum adaptive threshold $\text{Th}_{Max}$ in the second range 404 can be proportional to the a priori probability of each hypothesis (each condition H0, H1, etc.). For numerical stability, the maximum adaptive threshold $\text{Th}_{Max}$ can be bounded to a constant value when the maximum intensity value $I_{Max}$ falls below a specified threshold $\text{Val}_{Max}$.

Figure 5:
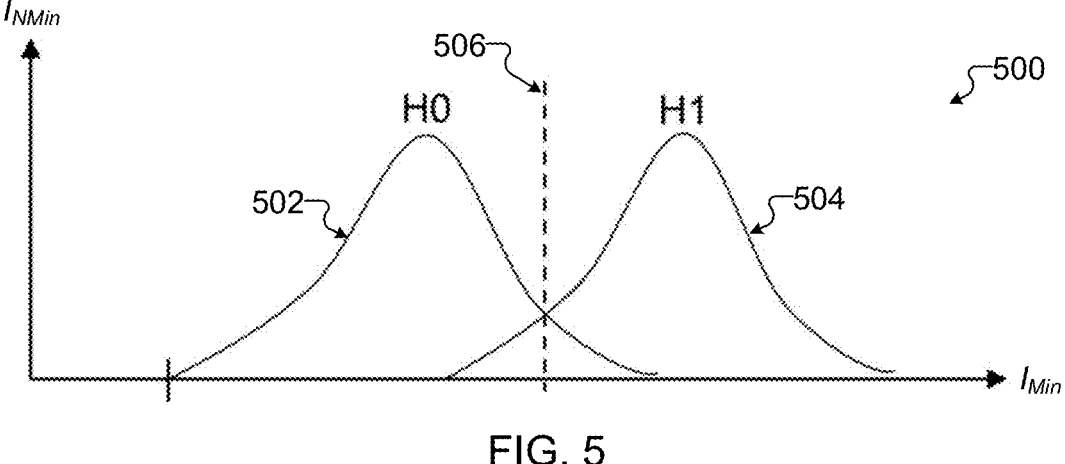
Figure 6:
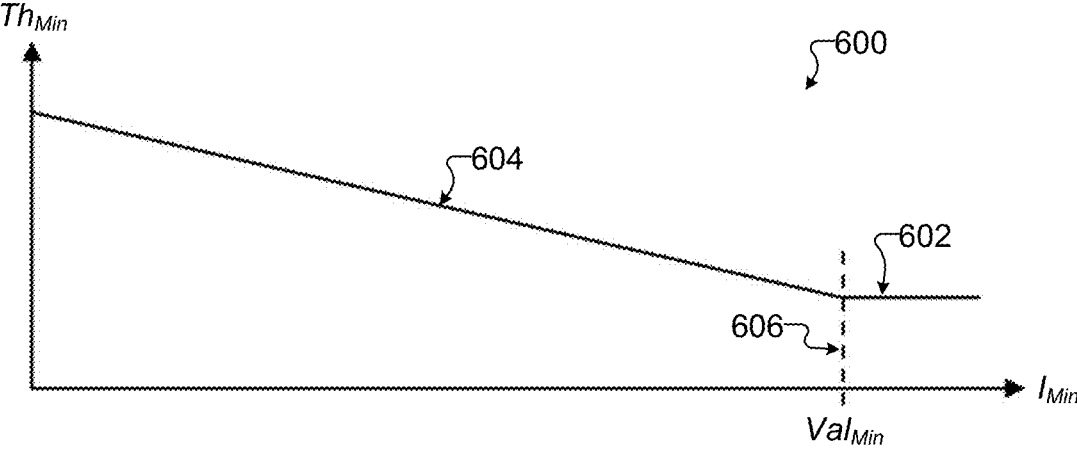

As shown in FIGS. 5 and 6, graphs 500 and 600 can be used to illustrate how the value of the minimum adaptive threshold $\text{Th}_{Min}$ can be selected. More specifically, the minimum adaptive threshold $\text{Th}_{Min}$ for use with an operation window can be based on the minimum intensity value $I_{Min}$ for the pixel values in the operation window. For a given minimum intensity value $I_{Min}$, the following likelihood model for the $N^{th}$ minimum intensity value $I_{NMm}$ may be defined. Under the condition H0 (having no long-tailed distribution), the likelihood/distribution of the $N^{th}$ minimum intensity value $I_{NMm}$ can be Gaussian with a mean at or close to the minimum intensity value $I_{Min}$. This condition is illustrated in FIG. 5, where a curve 502 represents the likelihood/distribution of the $N^{th}$ minimum intensity value $I_{NMm}$ under condition H0. Under the condition H1 (having a long-tailed distribution), the likelihood/distribution of the $N^{th}$ minimum intensity value $I_{NMm}$ can be Gaussian with a mean farther from the minimum intensity value $I_{Min}$. This condition is illustrated in FIG. 5, where a curve 504 represents the likelihood/distribution of the $N^{th}$ minimum intensity value $I_{NMm}$ under condition H1. Given these assumptions, the optimal value for the minimum adaptive threshold $\text{Th}_{Min}$ (minimum in the a posteriori probability sense) can be given by the value where the likelihood ratio is the same as the prior ratio. This point is identified along a line 506 in FIG. 5, which is where the curves 502 and 504 intersect.

Based on this, the graph 600 can be generated, which identifies the minimum adaptive threshold $\text{Th}_{Min}$ for different minimum intensity values $I_{Min}$. Here, the minimum adaptive threshold $\text{Th}_{Min}$ can have a constant value for a first range 602 of image brightness values (intensity values $I_{Min}$) and a decreasing value for a second range 604 of image brightness values. The second range 604 is larger than the first range 602, meaning the second range 604 spans a larger range of image brightness values. This allows for the use of a larger minimum adaptive threshold $\text{Th}_{Min}$ in dimmer areas of input image frames 202. Thus, the minimum adaptive threshold $\text{Th}_{Min}$ can be selected for use with any given input image frame 202 or color channel thereof based on the minimum intensity value $I_{Min}$ within the operation window of that input image frame 202 or color channel, namely by using that minimum intensity value $I_{Min}$ to select the corresponding minimum adaptive threshold $\text{Th}_{Min}$ within the graph 600. The selected value for the minimum adaptive threshold $\text{Th}_{Min}$ can be used to identify one or more dark pixels that generate image data that is too dark relative to other pixels in the operation window. Note that the slope of the minimum adaptive threshold $\text{Th}_{Min}$ in the second range 604 can be proportional to the a priori probability of each hypothesis (each condition H0, H1, etc.). For numerical stability, the minimum adaptive threshold $\text{Th}_{Min}$ can be bounded to a constant value when the minimum intensity value $I_{Min}$ rises above a specified threshold $\text{Val}_{Min}$.

In this way, the maximum and minimum intensity values $I_{Max}$ and $I_{Min}$ within an operation window can be used to select the maximum and minimum adaptive thresholds $Th_{Max}$ and $Th_{Min}$ used for bad pixel detection. This supports the use of likelihood-based adaptive thresholding for the bad pixel detection, meaning the applied thresholds $Th_{Max}$ and $Th_{Min}$ are adaptive and selected so as to increase or maximize the probability of bad pixel detection. This can enable more accurate and more effective identification of bad pixels even in the presence of different scenes being imaged.

Although FIGS. 3 through 6 illustrate examples of likelihood-based adaptive thresholds for use during multi-frame likelihood-based adaptive bad pixel correction, various changes may be made to FIGS. 3 through 6. For example, the graphs 400 and 600 representing the maximum and minimum adaptive thresholds $Th_{Max}$ and $Th_{Min}$ may vary in any number of ways, such as by altering the ranges in which the adaptive thresholds are increasing, decreasing, and constant or the rates (slopes) at which the adaptive thresholds increase and decrease.

FIGS. 7 through 11 illustrate examples of a multi-frame likelihood-based adaptive bad pixel correction operation 204 in the architecture 200 of FIG. 2 in accordance with this disclosure. The multi-frame bad pixel correction operation 204 here can be customized for multi-frame processing by differentiating between capture conditions for individual image frames while combining bad pixel information for the individual image frames. The various embodiments of the multi-frame bad pixel correction operation 204 shown in FIGS. 7 through 11 represent various ways in which the multi-frame bad pixel correction operation 204 can generate and use at least one refined bad pixel map. The described approaches can operate under the assumption that while the location of a defective pixel is highly unpredictable in any given individual input image frame, similar image capture contents across multiple input image frames can be exploited since bad pixel locations can generally be consistent across different image frames. In other words, bad pixel locations cannot move since the pixels themselves are fixed in an imaging sensor 180, and this spatial relation can be used to reduce false positives and thereby reduce associated issues (such as texture blurring) in the output images 210.

Figure 7:
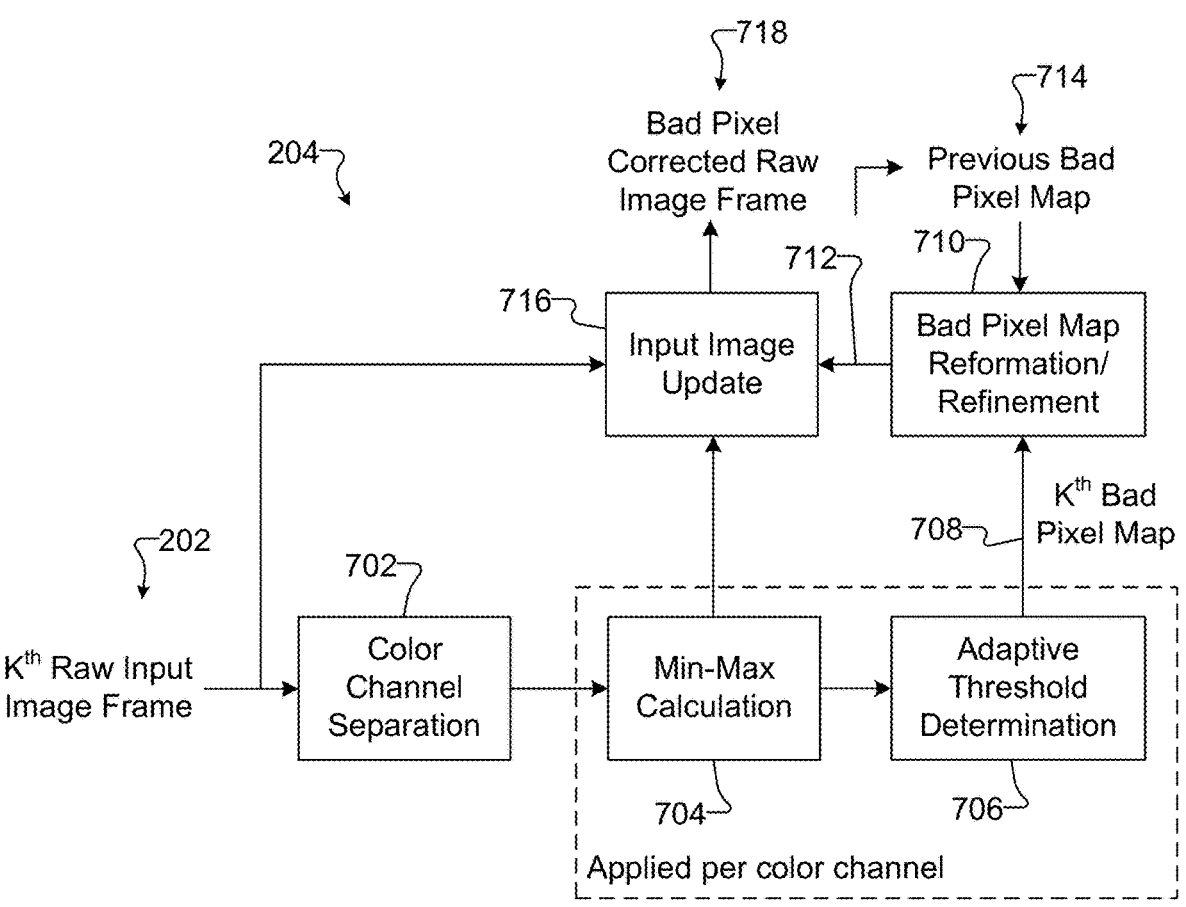
FIGS. 7 through 11 illustrate examples of a multi-frame likelihood-based adaptive bad pixel correction operation in the architecture of FIG. 2 in accordance with this disclosure.

As shown in FIG. 7, the multi-frame bad pixel correction operation 204 receives the raw input image frames 202. In some cases, the multi-frame bad pixel correction operation 204 may process the raw input image frames 202 sequentially. Here, the multi-frame bad pixel correction operation 204 performs a color channel separation function 702, which separates each raw input image frame 202 into its constituent color channels. As noted above, for instance, this may include separating the red color channel, blue color channel, and two green color channels of Bayer image frames or other raw input image frames 202. In some cases, the separation of the raw input image frames 202 into separate color channels (which may be referred to as color channel images) can help to facilitate more effective correction of bad pixel data and more effective identification of thresholds and maximum/minimum values by other functions of the multi-frame bad pixel correction operation 204.

The color channel images are provided to a min-max calculation function 704, which identifies (for each color channel of each raw input image frame 202) statistical properties of the image data in the color channel images. For example, the min-max calculation function 704 can define an operation window and analyze pixel data in each color channel image falling within the operation window in order to identify statistical properties of the image data within the operation window. As particular examples, the min-max calculation function 704 may identify the maximum, $N^{th}$ maximum, minimum, and $N^{th}$ minimum intensity values within the operation window for each color channel image. The min-max calculation function 704 can move the operation window within each color channel image, such as by sliding the operation window, in order to process different collections of pixel data within each color channel image and identify the statistical properties for each position of the operation window.

An adaptive threshold determination function 706 can be used to identify and apply adaptive threshold values, such as by identifying and applying the maximum and minimum thresholds $Th_{Max}$ and $Th_{Min}$ described above. The adaptive threshold values can vary depending on the raw input image frames 202 being processed. For instance, in some embodiments, the adaptive threshold determination function 706 can identify the adaptive maximum and minimum thresholds $Th_{Max}$ and $Th_{Min}$ using the graphs 400 and 600 shown in FIGS. 4 and 6. By applying the adaptive thresholds to the statistical properties of the image data as determined by the min-max calculation function 704, the multi-frame bad pixel correction operation 204 can generate an initial bad pixel map for each of the color channels, where each initial bad pixel map identifies bad pixels as determined using the associated color channel image. The initial bad pixel maps for the color channels can be combined in order to generate a bad pixel map 708 for the input image frame 202. In this example, each input image frame 202 can be processed (possibly consecutively), and a corresponding bad pixel map 708 can be generated for that input image frame 202 (possibly sequentially).

A bad pixel map reformation/refinement function 710 is used to process the bad pixel maps 708 and combine the contents of the bad pixel maps 708 in order to produce refined bad pixel maps 712. For example, the bad pixel map reformation/refinement function 710 may perform a morphological operation to remove clusters of bad pixels identified in each bad pixel map 708 or to perform some other spatial filtering of the bad pixel maps 708. As a particular example, the morphological operation may be implemented using erode and dilate operations, such as erode and dilate operations that occur within a 3×3 window or other window in each bad pixel map 708. As another particular example, the morphological operation may implement one or more filters, convolution filters, masks, or other logic that removes clusters of bad pixels having particular shapes, such as by removing a row identified as having at least a specified number of bad pixels (like five or more consecutive bad pixels). The morphological operation used here can be based on the assumption that bad pixels rarely occur in large numbers within a small area, and any bad pixels identified in this manner may be erroneous and may more likely be indicative of an over-saturated or under-saturated region or other issue.

The bad pixel map reformation/refinement function 710 can also refine at least one of the bad pixel maps 708 based on a previous bad pixel map 714. In some cases, for instance, the bad pixel map reformation/refinement function 710 may generate a bad pixel map 708 for the first input image frame 202 being processed. This bad pixel map 708 can be fed back as a previous bad pixel map 714, and the bad pixel map reformation/refinement function 710 may generate a bad pixel map 708 for the second input image frame 202 being processed. The bad pixel map reformation/refinement function 710 may also refine that bad pixel map 708 using the previous bad pixel map 714 in order to generate a refined bad pixel map 712. The refined bad pixel map 712 can be fed back as another previous bad pixel map 714, and the bad pixel map reformation/refinement function 710 may generate a bad pixel map 708 for the third input image frame 202 and refine that bad pixel map 708 using the previous bad pixel map 714 in order to generate another refined bad pixel map 712. This process can continue until all input image frames 202 have been processed.

This approach supports the sequential refinement of bad pixel maps 708, where the bad pixel map 708 for a given input image frame 202 is refined based on the previous bad pixel map 714 (which is associated with all previous input image frames 202, if any). In some embodiments, the bad pixel map reformation/refinement function 710 refines a current bad pixel map 708 by removing any pixels in the current bad pixel map 708 that do not also appear in the previous bad pixel map 714. Thus, each refined bad pixel map 712 can effectively identify all bad pixels that have been consistently identified by the current bad pixel map 708 and all prior bad pixel maps 708. This can effectively be viewed as a logical AND operation between the contents of the current bad pixel map 708 and the contents of the previous bad pixel map 714. In some cases, this approach supports "on-the-fly" generation of the refined bad pixel maps 712.

The bad pixel map 708 for the first input image frame 202 processed (since it is not refined by an earlier bad pixel map) and each refined bad pixel map 712 produced by the bad pixel map reformation/refinement function 710 can be used by an input image update function 716, which generally operates to modify each raw input image frame 202 based on its associated bad pixel map 708, 712. This results in the generation of a bad pixel corrected raw image frame 718 for each raw input image frame 202. For example, each bad pixel map 708, 712 provided by the bad pixel map reformation/refinement function 710 can identify coordinates in the associated raw input image frame 202 where pixel values may be invalid due to the presence of bad pixels in an imaging sensor 180. The input image update function 716 can therefore process the raw input image frame 202 in order to replace the pixel values from the bad pixels in the imaging sensor 180 at the identified coordinates with more suitable pixel values.

The input image update function 716 can use any suitable technique to update pixel values at locations identified by the bad pixel maps 708, 712. As noted above, this may include the input image update function 716 averaging neighboring pixel values around each bad pixel location, generating a weighted combination of neighboring pixel values around each bad pixel location, or replacing a pixel value from a bad pixel with a pixel value from a neighboring pixel. In some embodiments, the input image update function 716 may replace a pixel value from a hot/bright pixel with the $N^{th}$ maximum value in the operation window, and the input image update function 716 may replace a pixel value from a dark pixel with the $N^{th}$ minimum value in the operation window.

Figure 8:
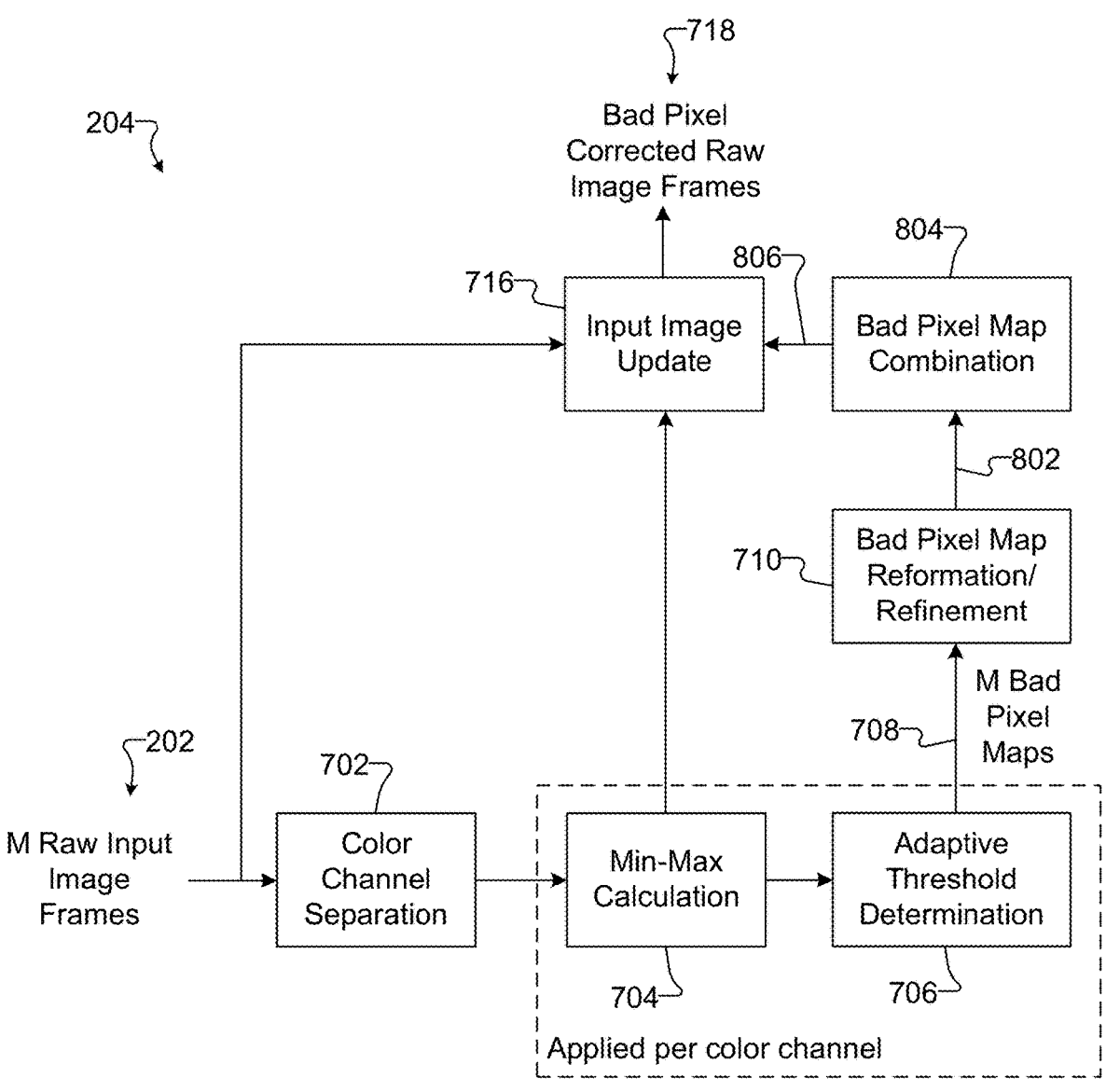

As shown in FIG. 8, the multi-frame bad pixel correction operation 204 receives the raw input image frames 202. In some cases, the multi-frame bad pixel correction operation 204 may process the raw input image frames 202 sequentially or in parallel. The multi-frame bad pixel correction operation 204 performs the color channel separation function 702 to separate each raw input image frame 202 into its constituent color channels. The resulting color channel images are provided to the min-max calculation function 704, which identifies statistical properties of the image data in the color channel images. The adaptive threshold determination function 706 can be used to identify and apply adaptive threshold values, such as by identifying and applying the maximum and minimum thresholds $Th_{Max}$ and $Th_{Min}$ described above. In this example, each input image frame 202 can be processed, and a corresponding bad pixel map 708 can be generated for that input image frame 202 as described above. The bad pixel map reformation/refinement function 710 can process the bad pixel maps 708, such as by applying the morphological operation to the bad pixel maps 708, in order to generate bad pixel maps 802. Note that the bad pixel map reformation/refinement function 710 here need not perform refinement based on one or more previous bad pixel maps 714 as done in FIG. 7.

A bad pixel map combination function 804 combines the contents of all of the bad pixel maps 802 in order to produce a refined bad pixel map 806. For example, the bad pixel map combination function 804 can generate a refined bad pixel map 806 identifying pixels that are marked as being bad in all of the bad pixel maps 802. This can effectively be viewed as a logical AND operation between the contents of the bad pixel maps 802. The refined bad pixel map 806 can be used by the input image update function 716 to correct all of the input image frames 202 and generate the bad pixel corrected raw image frames 718.

In this approach, for a pixel to be identified as a bad pixel in the refined bad pixel map 806, that pixel should be identified as a bad pixel in all the bad pixel maps 802. Note that this approach may need all captured input image frames 202 to be available for processing at or near the same time so that the bad pixel maps 802 can be generated and combined with one another. Given resource limitations of some electronic devices 101, this may mean that the number of input image frames 202 being processed should be relatively small. However, other devices, such as the server 106 or other devices with fewer resource limitations, may process larger numbers of input image frames 202 if needed or desired.

The approaches shown in FIGS. 7 and 8 can be effective when bad pixels remain consistently bad during use. In other words, these approaches can be effective when a pixel constantly outputs a value that is too bright or too dark. In other cases, it is possible for bad pixels to be inconsistent in the generation of bad pixel data. Among other things, this may be due to changes in image intensities for a given input image frame versus another input image frame (such as due to moving objects in between frames) or due to hardware sensor fluctuations. Thus, bad pixel data from a bad pixel might be present only in one input image frame 202 or in some input image frames 202 but not in all input image frames 202. These types of bad pixels may be referred to as "blinking" pixels. In these cases, it may be desirable to remove an isolated bad pixel from the input image frame(s) 202 as part of the process of merging all of the input image frames 202 in order to produce the bad pixel corrected raw image frames 718.

Figure 9:
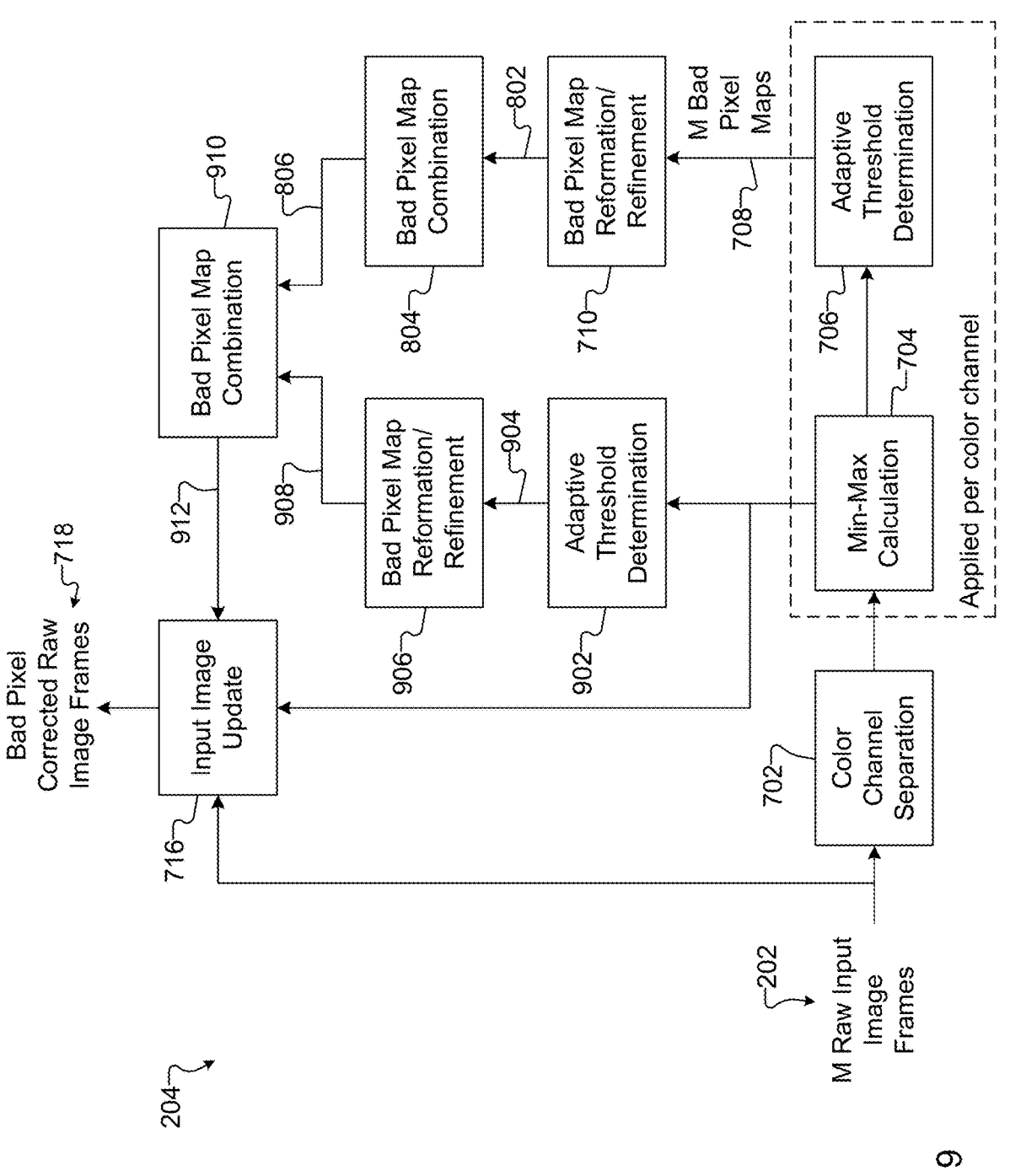

As shown in FIG. 9, the multi-frame bad pixel correction operation 204 can support this type of approach. In FIG. 9, the multi-frame bad pixel correction operation 204 receives the raw input image frames 202. The color channel separation function 702 separates each raw input image frame 202 into its constituent color channels, and the min-max calculation function 704 identifies statistical properties of the image data in the resulting color channel images. The adaptive threshold determination function 706 can be used to identify and apply adaptive threshold values, such as the maximum and minimum thresholds $Th_{Max}$ and $Th_{Min}$ described above. Each input image frame 202 can be processed, and a corresponding bad pixel map 708 can be generated for that input image frame 202. The bad pixel map reformation/refinement function 710 processes the bad pixel maps 708, such as by applying the morphological operation to the bad pixel maps 708, in order to generate bad pixel maps 802. The bad pixel map combination function 804 combines the contents of all of the bad pixel maps 802 in order to produce an intermediate bad pixel map 806.

In addition, another adaptive threshold determination function 902 can be used to apply one or more different adaptive threshold values (such as a larger threshold than the maximum threshold $Th_{Max}$ and/or a smaller threshold than the minimum threshold $Th_{Min}$) to the statistical properties identified by the min-max calculation function 704 for each of the input image frames 202. In some cases, the larger maximum threshold may be determined by adding a specified amount or percentage to the maximum threshold $Th_{Max}$, and/or the smaller minimum threshold may be determined by subtracting a specified amount or percentage from the minimum threshold $Th_{Min}$. The use of the different threshold(s) by the adaptive threshold determination function 902 can help in the identification of any prominent bad pixels present in one or several (but not all) of the input image frames 202. This results in the generation of another bad pixel map 908 for each of the input image frames 202.

Another bad pixel map combination function 910 combines the intermediate bad pixel map 806 with each bad pixel map 908 in order to generate a refined bad pixel map 912 for each input image frame 202. For instance, the bad pixel map combination function 910 may combine an intermediate bad pixel map 806 with a bad pixel map 908 by identifying which pixels are marked as being bad in either of the bad pixel maps 806, 908. This can effectively be viewed as a logical OR operation between the contents of the intermediate bad pixel map 806 and the contents of each bad pixel map 908. The input image update function 716 can use the refined bad pixel maps 912 to modify the input image frames 202 as needed.

Figure 10:
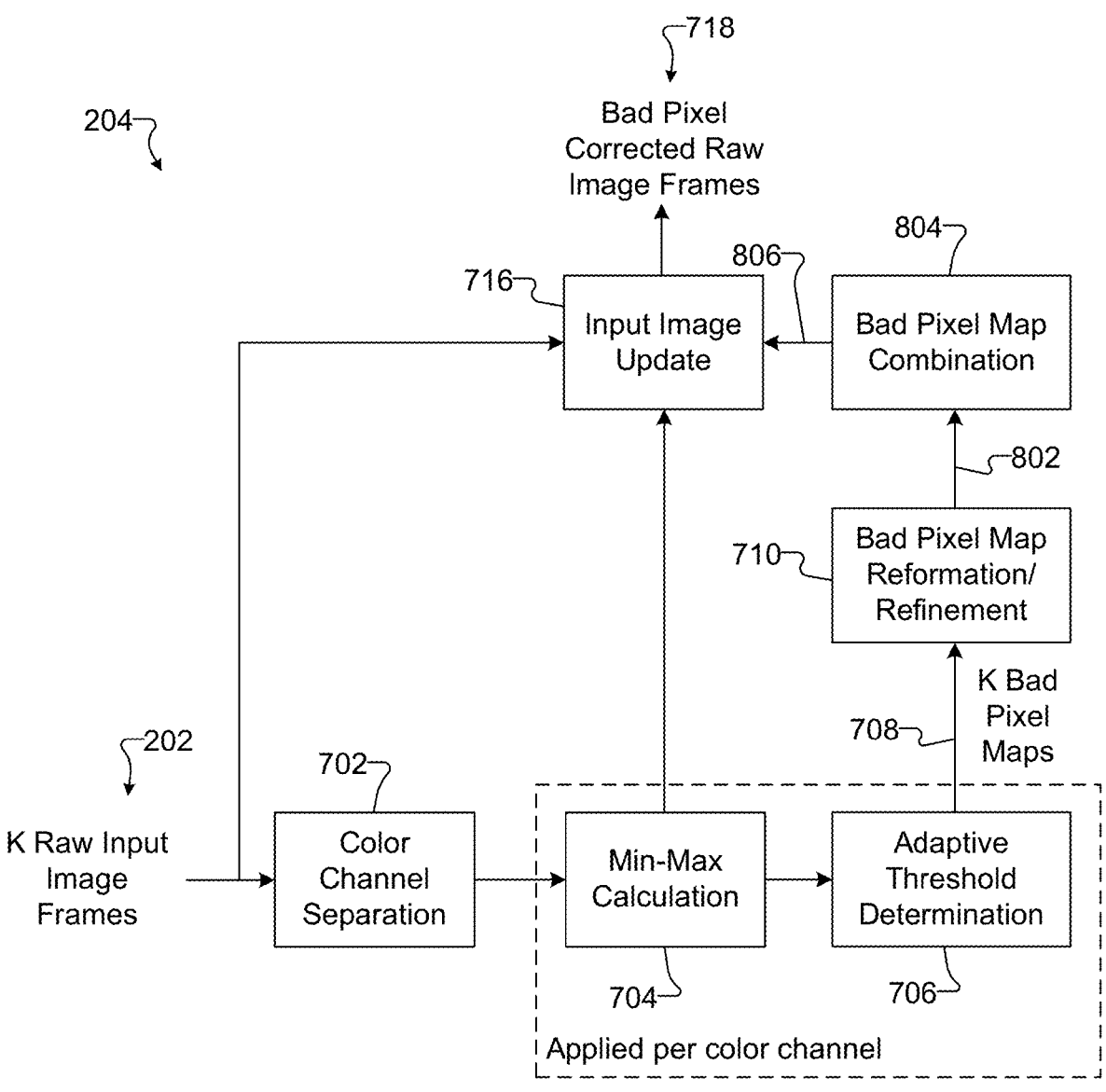

In the above three examples, all of the input image frames 202 are processed (such as sequentially or in parallel), and M may be used to represent the total number of input image frames 202 in the collection of image frames being processed. In other cases, it is possible to exploit batch processing of input image frames 202, which may be used to overcome certain computational overloads or achieve other benefits. During batch processing, only K input image frames 202 (where K<M) may be processed at a time in order to generate bad pixel maps, and at least one refined bad pixel map may be generated for those K frames. This can be achieved using any of the approaches shown in FIGS. 7 through 9. An example of this type of approach is shown in FIG. 10, where K of the input image frames 202 are processed as a batch using the approach of FIG. 8. The same or similar batch processing may be used in the approach of FIG. 7 or FIG. 9. In some cases, the at least one refined bad pixel map 806 generated for the K input image frames 202 may be independent of the refined bad pixel map(s) 806 generated for other input image frames 202.

Figure 11:
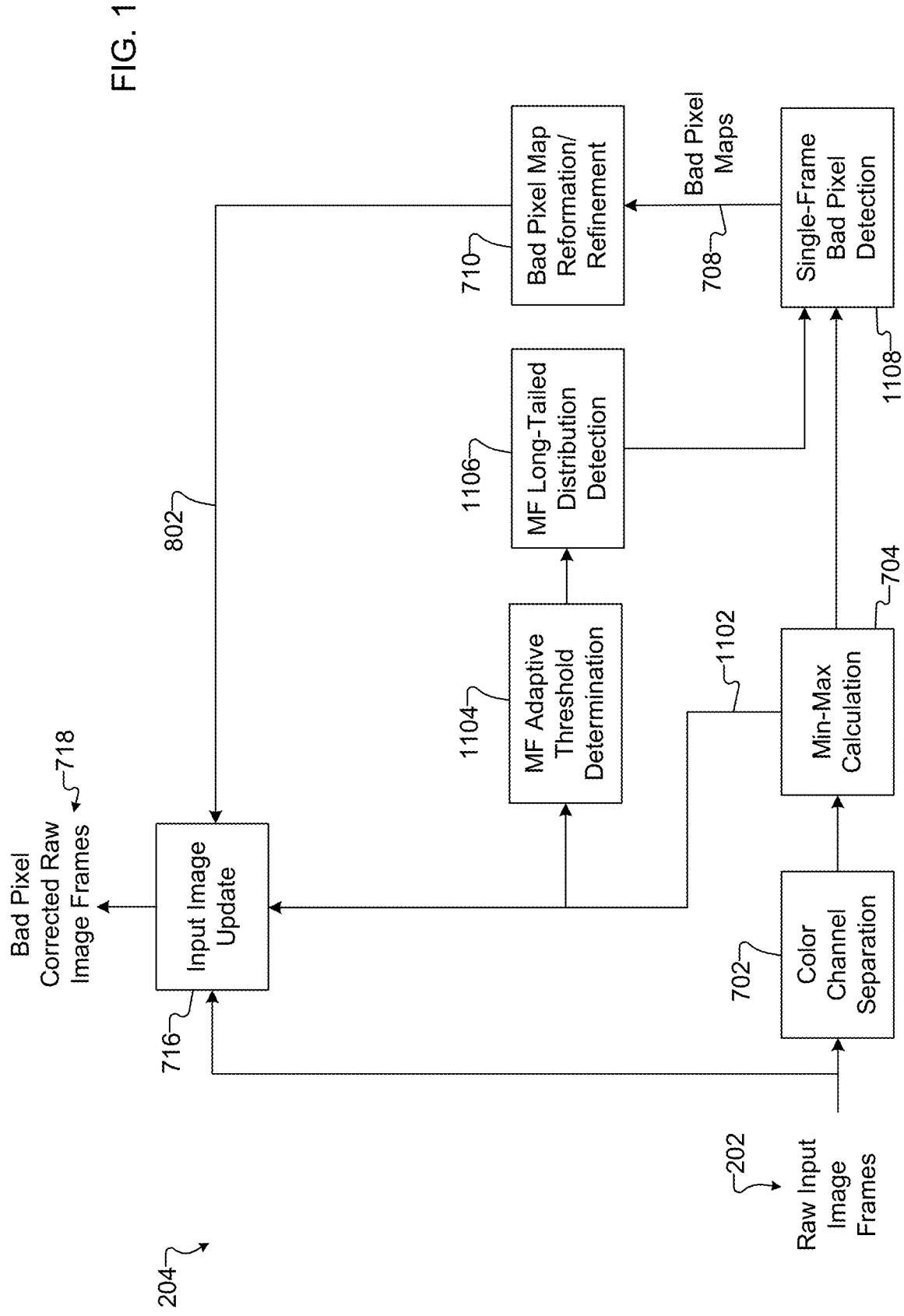

In the above examples, the input image frames 202 are separated into color channels so that initial bad pixel maps can be generated for the individual color channels and then combined in order to produce the bad pixel maps for the input image frames 202. In other embodiments, bad pixel maps can be generated for the input image frames 202 directly from the statistical properties of the input image frames 202 without generating separate initial bad pixel maps for separate color channels first. An example of this type of approach is shown in FIG. 11, where the multi-frame bad pixel correction operation 204 receives the raw input image frames 202. The multi-frame bad pixel correction operation 204 here may receive a subset K of input image frames 202 or all M input image frames 202. The color channel separation function 702 separates each raw input image frame 202 into its constituent color channels, and the min-max calculation function 704 identifies statistical properties of the image data in the resulting color channel images.

A multi-frame (MF) adaptive threshold determination function 1104 here can generate maximum and minimum adaptive thresholds based on statistical properties of the various color channel images for all of the K or M input image frames 202 being processed. In some cases, the multi-frame maximum and minimum adaptive thresholds may represent scaled versions of the single-frame maximum and minimum adaptive thresholds $Th_{Max}$ and $Th_{Min}$ determined as described above, such as when each maximum and minimum adaptive threshold $Th_{Max}$ or $Th_{Min}$ is multiplied by the number of input image frames 202 being processed. A multi-frame long-tailed distribution detection function 1106 can sum or otherwise aggregate the statistical properties across the various color channel images for all of the K or M input image frames 202 being processed. The multi-frame long-tailed distribution detection function 1106 can also process the aggregated statistical properties based on the maximum and minimum adaptive thresholds and determine whether the aggregated statistical properties form a long-tailed distribution. In this approach, the multi-frame long-tailed distribution detection function 1106 can use the statistical properties determined for the entire collection of input image frames 202 being processed (rather than for each input image frame 202 individually) in order to determine if the noise distribution is a long-tailed distribution for the collection of input image frames 202.

In some embodiments, the operations of the functions 1104-1106 may be performed as follows. For a given number of input image frames K (where $K \in [2, M]$), a distribution may be considered long-tailed if it satisfies the following conditions across the K input image frames 202. If $\Sigma_k(I_{Max}-I_{NMax})>Th_{MaxMF}$, a multi-frame distribution decision $D_{MF}$ for a pixel can equal one since this is indicative of the pixel being associated with a hot or bright long-tailed distribution. If $\Sigma_k(I_{NMin}-I_{Min})>Th_{MinMF}$, the multi-frame distribution decision $D_{MF}$ for the pixel can equal one since this is indicative of the pixel being associated with a dark long-tailed distribution. Otherwise, the multi-frame distribution decision $D_{MF}$ for the pixel can equal zero. Here, $Th_{MaxMF}$ and $Th_{MinMF}$ represent the multi-frame adaptive thresholds as identified by the adaptive threshold determination function 1104.

The multi-frame distribution decisions $D_{MF}$ for the pixels of the input image frames 202 as determined by the multi-frame long-tailed distribution detection function 1106 and the statistical properties as determined by the min-max calculation function 704 are provided to a single-frame bad pixel detection function 1108, which can process this information to identify bad pixels for individual ones of the input image frames 202. For example, the single-frame bad pixel detection function 1108 can use the distribution decisions Dar for the pixels of each input image frame 202 and, for those pixels identified as being in a long-tailed distribution, determine whether the statistical properties as determined by the min-max calculation function 704 are indicative of the pixels being bad. As a particular example, the single-frame bad pixel detection function 1108 may use the following to determine whether a pixel associated with an input image frame 202 is a bad hot or bright pixel.

$$(D_{MF} = 1) \& (I_{Img} > I_{NMax})$$

The single-frame bad pixel detection function 1108 may also use the following to determine whether a pixel associated with an input image frame 202 is a dark pixel.

$$(D_{MF} = 1) \& (I_{Img} < I_{NMin})$$

The determinations by the single-frame bad pixel detection function 1108 are used to generate the bad pixel maps 708 for the input image frames 202. The bad pixel map reformation/refinement function 710 processes the bad pixel maps 708, such as by applying the morphological operation to the bad pixel maps 708, in order to generate bad pixel maps 802. The input image update function 716 can use the bad pixel maps 802 (or a combination of the bad pixel maps 802) to modify the input image frames 202 and generate the bad pixel corrected raw image frames 718.

Note that, in some embodiments, the type(s) of semantic content contained in images being captured may be used to control one or more aspects of the multi-frame bad pixel correction operation 204. Images can vary widely in terms of the image contents captured in the images, and the broad categories of image contents that may be captured can be referred to as different types or classes of semantic content. Examples of semantic content types or classes could include people, animals, trees/shrubs/other foliage, buildings/houses/other structures, the ground, the sky, and water. In some cases, the type or types of semantic content present in captured image frames may be used to control one or more thresholds used to identify bad pixels, to control how the one or more thresholds may be adapted, to control how the morphological operation is performed, or to control how image content for bad pixels is replaced. In some cases, for instance, the semantic content of surrounding pixels may be used to replace the image content of a bad pixel.

Also note that the above approaches may be described as determining and applying at least one refined bad pixel map to a specific collection of input image frames 202 being processed, where the refined bad pixel map or maps are based on those input image frames 202. However, other approaches may also be used. For example, bad pixel locations as determined using one or more collections of input image frames 202 may be stored (such as in a non-volatile memory of an electronic device 101) and applied to subsequent input image frames 202 captured using the electronic device 101. In those cases, refined bad pixel maps may not need to be generated for the subsequent input image frames 202. As another example, bad pixel locations may be determined for a reference input image frame 202 using one of the techniques described above and then applied to other input image frames 202, and refined bad pixel maps may not need to be generated for the other input image frames 202. As yet another example, bad pixel locations may be determined for certain input image frames 202 (more "useful" image frames) and then applied to other input image frames 202 (less "useful" image frames), and refined bad pixel maps may not need to be generated for the less useful image frames 202. One or more criteria may be used to determine whether an input image frame 202 is more or less useful, such as motion content, deghosting maps, etc.

Although FIGS. 7 through 11 illustrate examples of a multi-frame likelihood-based adaptive bad pixel correction operation 204 in the architecture 200 of FIG. 2, various changes may be made to FIGS. 7 through 11. For example, various components and functions in FIGS. 7 through 11 may be combined, further subdivided, replicated, or rearranged according to particular needs. Also, one or more additional components and functions may be included if needed or desired. In addition, aspects of the approaches shown in different ones of FIGS. 7 through 11 may be combined as needed or desired. As a particular example, the number of input image frames 202 to be processed may be used to select a particular one of the implementations of the multi-frame likelihood-based adaptive bad pixel correction operation 204 shown in FIGS. 7 through 11. As another particular example, the number of bad pixels determined for a first input image frame 202 being processed may be used to select a particular one of the implementations of the multi-frame likelihood-based adaptive bad pixel correction operation 204 shown in FIGS. 7 through 11 for use in processing subsequent input image frames 202.

FIG. 12 illustrates an example multi-frame processing operation 206 in the architecture 200 of FIG. 2 in accordance with this disclosure. As shown in FIG. 12, the bad pixel corrected raw image frames 718 are provided to an image registration function 1202, which generally operates to align the bad pixel corrected raw image frames 718 and produce aligned image frames. For example, the image registration function 1202 may determine how one or more image frames would need to be warped or otherwise modified in order to more closely align one or more features in the image frames and then warp or otherwise modify the one or more image frames. Registration may be needed in order to compensate for misalignment caused by the electronic device 101 moving or rotating in between image captures, which causes objects in the raw input image frames 202 to move or rotate slightly (as is common with handheld devices). The image registration function 1202 may use any suitable technique for image registration. In some cases, the bad pixel corrected raw image frames 718 can be aligned both geometrically and photometrically. In particular embodiments, the image registration function 1202 can use global Oriented FAST and Rotated BRIEF (ORB) features and local features from a block search to identify how to align the image frames. However, other implementations of the image registration function 1202 could also be used.

A reference frame selection function 1204 can process the aligned bad pixel corrected raw image frames 718 in order to select one as a reference image frame. The selected image frame is used as a reference frame in subsequent processing operations, while remaining aligned bad pixel corrected raw image frames 718 can be treated as non-reference image frames. The reference frame selection function 1204 may use any suitable technique to select a reference image frame, such as by selecting the aligned bad pixel corrected raw image frame 718 that is most evenly balanced in terms of exposure, was captured using an auto-exposure setting, or that satisfies some other criterion or criteria. The image frames are preprocessed using an image preprocessing function 1206, which can perform any desired operation(s) using the aligned image frames. For instance, the image preprocessing function 1206 may perform image segmentation in order to identify discrete objects, foreground, and background in the aligned image frames or perform semantic correspondence identification in order to identify relationships between semantic contents in the aligned image frames. The image preprocessing function 1206 may include any other or additional function or functions applied to aligned or other image frames.

The preprocessed image frames are provided to a multi-frame blending function 1208, which combines the preprocessed image frames in order to produce a combined frame. The multi-frame blending function 1208 may use any suitable technique to combine image data from multiple image frames in order to produce a combined image. For example, the multi-frame blending function 1208 may take the reference frame and replace one or more portions of the reference frame containing motion with one or more corresponding portions of shorter-exposure image frames. As a particular example, the multi-frame blending function 1208 may perform a weighted blending operation to combine the pixel values contained in the aligned image frames. In general, this disclosure is not limited to any particular technique for combining image frames. Among other functions, the multi-frame blending function 1208 can perform deghosting to help remove ghosting artifacts, which can be created by moving objects in different locations within the aligned bad pixel corrected raw image frames 718.

An edge noise filtering function 1210 can be used to filter the image data of the combined image in order to remove noise from object edges, which can help to provide cleaner edges to objects in the combined image. The edge noise filtering function 1210 may be implemented in any suitable manner. A tone mapping function 1212 can be used to adjust colors in the combined image, which can be useful or important in various applications, such as when generating HDR images. For instance, since generating an HDR image often involves capturing multiple images of a scene using different exposures and combining the captured images to produce the HDR image, this type of processing can often result in the creation of unnatural tone within the HDR image. The tone mapping function 1212 can therefore use one or more color mappings to adjust the colors contained in the combined image. The tone mapping function 1212 may be implemented in any suitable manner. A spatial noise filtering function 1214 can be used to spatially filter the contents of the combined image in order to remove noise from the combined image.

The post-processed image is output as a blended image 1216, which may be provided to the image signal processing operation 208 for use in producing an output image 210. The image signal processing operation 208 may perform any desired operation(s) on the blended image 1216 that might not already have been performed in the multi-frame processing operation 206. Note, however, that the multi-frame processing operation 206 may itself produce the blended image 1216 as the output image 210 without further processing of the blended image 1216.

Although FIG. 12 illustrates one example of a multi-frame processing operation 206 in the architecture 200 of FIG. 2, various changes may be made to FIG. 12. For example, various components and functions in FIG. 12 may be combined, further subdivided, replicated, or rearranged according to particular needs. Also, one or more additional components and functions may be included if needed or desired. In addition, while FIG. 12 illustrates one example technique in which bad pixel corrected raw image frames 718 may be combined, any other suitable techniques may be used here.

FIGS. 13A and 13B illustrate example results that may be obtained using multi-frame likelihood-based adaptive bad pixel correction in image processing applications or other applications in accordance with this disclosure. More specifically, FIGS. 13A and 13B illustrate example results that may be obtained using the architecture 200 of FIG. 2. Note, however, that the architecture 200 may be used in any other suitable manner.

In FIG. 13A, a software-based single-frame bad pixel correction process has been applied to produce an image 1300, which can help to remove bad pixel data from the image 1300. However, this approach has created a number of issues in the image 1300. For example, quite a few textural details have been lost. This can be seen by the blurrier nature of the bread loaf shown in FIG. 13A. Among other reasons, this may be due to a larger number of false alarms in which valid pixel data is flagged as being bad and removed, which can result in texture blurring and detail losses.

In FIG. 13B, the architecture 200 has been applied to produce an image 1302, which can help to remove bad pixel data from the image 1302. Moreover, the image 1302 includes more textural details compared to the image 1300. This can be seen by the clearer nature of the bread loaf shown in FIG. 13B. As a result, there is less texture blurring and less detail losses in the image 1302 compared to the image 1300. Because of this, the image 1302 is much clearer and is much more visually acceptable to human observers, and the image 1302 is a much more accurate representation of the imaged scene (even after bad pixel correction has been performed).

Although FIGS. 13A and 13B illustrate one example of results that may be obtained using multi-frame likelihood-based adaptive bad pixel correction in image processing applications or other applications, various changes may be made to FIGS. 13A and 13B. For example, the actual contents of image frames can vary widely, and FIGS. 13A and 13B do not limit the scope of this disclosure to any particular type of image contents. In general, multi-frame likelihood-based adaptive bad pixel correction can be performed with any suitable image data related to any suitable scenes being imaged.

FIG. 14 illustrates an example method 1400 for multi-frame likelihood-based adaptive bad pixel correction in image processing applications or other applications in accordance with this disclosure. For ease of explanation, the method 1400 shown in FIG. 14 is described as being performed by the electronic device 101 in the network configuration 100 of FIG. 1, where the electronic device 101 can implement the architecture 200 shown in FIG. 2. However, the method 1400 shown in FIG. 14 could be performed by any other suitable device(s) and in any other suitable system(s), such as when the method 1400 is performed using the server 106.

As shown in FIG. 14, multiple input image frames are obtained at step 1402. This may include, for example, the processor 120 of the electronic device 101 obtaining input image frames 202 using one or more imaging sensors 180. In some cases, the input image frames 202 may include at least two input image frames captured using different capture conditions, such as different ISO values, exposure times, image contents, or other exposure settings. Color channels of each input image frame are separated at step 1404. This may include, for example, the processor 120 of the electronic device 101 performing the color channel separation function 702 to separate each of the input image frames 202 into multiple color channel images, such as a red color channel image, a blue color channel image, and two green color channel images for each input image frame 202.

Statistical properties of image data in the color channels and associated adaptive thresholds are identified at step 1406. This may include, for example, the processor 120 of the electronic device 101 performing the min-max calculation function 704 to identify maximum, $N^{th}$ maximum, minimum, and $N^{th}$ minimum intensity values for image data contained in an operation window that is moved within each input image frame 202 or color channel thereof. This may also include the processor 120 of the electronic device 101 performing the adaptive threshold determination function 706 to identify maximum and minimum adaptive thresholds to be applied to the image data in each input image frame 202 or color channel thereof, where the maximum and minimum adaptive thresholds are based on the statistical properties and are used to identify hot/bright pixels and dark pixels.

A bad pixel map is generated for each input image frame using the associated adaptive thresholds at step 1408. This may include, for example, the processor 120 of the electronic device 101 applying the associated adaptive thresholds to the image data of the input image frames 202. During this step, each bad pixel map can be generated by identifying one or more outliers in pixel values in one or more of the color channel images of the corresponding input image frame 202 or in the input image frame 202 itself, such as based on a distribution of the pixel values contained in the specified operation window. In some cases, the specified operation window may have a window size that is based on the capture condition(s) associated with the corresponding input image frame 202, such as when lower ISO values or shorter exposure times have smaller window sizes and higher ISO values or longer exposure times have larger window sizes. Identifying the one or more outliers within the operation window may involve applying the adaptive thresholds associated with the input image frame 202 to identify the one or more outliers in the input image frame 202.

One or more refined bad pixel maps are generated using the bad pixel maps at step 1410. This may include, for example, the processor 120 of the electronic device 101 performing various functions shown in one or more of FIGS. 7 through 11 in order to combine bad pixel maps associated with different input image frames 202 and generate one or more refined bad pixel maps. As particular examples, this may include the processor 120 of the electronic device 101 refining a bad pixel map associated with a Kth input image frame 202 based on a bad pixel map associated with the prior K 1 input image frames 202 (as in FIG. 7), combining all of the bad pixel maps associated with all or a subset of the input image frames 202 (as in FIG. 8 or 10), combining all of the bad pixel maps associated with all or a subset of the input image frames 202 and combining the resulting bad pixel map with a bad pixel map of a particular input image frame 202 generated using different thresholds (as in FIG. 9), or performing single-frame bad pixel detection based on multi-frame long-tailed distribution detection (as in FIG. 11).

One or more pixel values in at least one of the input image frames are updated based on the refined bad pixel map(s) at step 1412. This may include, for example, the processor 120 of the electronic device 101 performing the input image update function 716 to update one or more pixel values at one or more coordinates identified in the refined bad pixel map(s). This can result in the creation of bad pixel corrected raw image frames 718. The bad pixel corrected raw image frames are blended to produce a blended image at step 1414. This may include, for example, the processor 120 of the electronic device 101 performing the multi-frame processing operation 206 and optionally the image signal processing operation 208 to produce an output image 210 based on the bad pixel corrected raw image frames 718. The blended image is stored, output, or used in some manner at step 1416. For example, the output image 210 may be displayed on the display 160 of the electronic device 101, saved to a camera roll stored in a memory 130 of the electronic device 101, or attached to a text message, email, or other communication to be transmitted from the electronic device 101. Of course, the output image 210 could be used in any other or additional manner.

Although FIG. 14 illustrates one example of a method 1400 for multi-frame likelihood-based adaptive bad pixel correction in image processing applications or other applications, various changes may be made to FIG. 14. For example, while shown as a series of steps, various steps in FIG. 14 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining multiple input image frames;
   generating bad pixel maps associated with different ones of the input image frames, each bad pixel map generated using first and second adaptive thresholds that are based on statistical properties of image data contained in a specified operation window within the associated input image frame;
   generating at least one refined bad pixel map using the bad pixel maps associated with two or more of the input image frames; and
   using one or more coordinates of one or more bad pixels identified in the at least one refined bad pixel map to update one or more pixel values of at least one of the input image frames;
   wherein the first adaptive threshold is used to identify one or more hot or bright pixels that generate image data that is too bright relative to other pixels in the specified operation window, the first adaptive threshold having (i) a constant value for a first range of image brightness values and (ii) an increasing value for a second range of image brightness values, the second range larger than the first range; and
   wherein the second adaptive threshold is used to identify one or more dark pixels that generate image data that is too dark relative to other pixels in the specified operation window, the second adaptive threshold having (i) a decreasing value for a third range of image brightness values and (ii) a constant value for a fourth range of image brightness values, the third range larger than the fourth range.

2. The method of claim 1, wherein:
   the first adaptive threshold is used to identify one or more hot or bright pixels that generate image data that is too bright relative to other pixels in the specified operation window; and
   the second adaptive threshold is used to identify one or more dark pixels that generate image data that is too dark relative to other pixels in the specified operation window.

3. The method of claim 2, wherein:
   the first adaptive threshold has (i) a constant value for a first range of image brightness values and (ii) an increasing value for a second range of image brightness values, the second range larger than the first range; and the second adaptive threshold has (i) a decreasing value for a third range of image brightness values and (ii) a constant value for a fourth range of image brightness values, the third range larger than the fourth range.

4. The method of claim 1, wherein generating the bad pixel maps associated with different ones of the input image frames comprises, for each of the input image frames:

separating the input image frame into multiple color channels;

generating an initial bad pixel map for each of the color channels; and combining the initial bad pixel maps for the color channels to generate the bad pixel map for the input image frame.

5. The method of claim 4, wherein generating the initial bad pixel map for each of the color channels comprises:

identifying first and $N^{th}$ maximum and minimum pixel values based on pixel values within the specified operation window;

identifying the first and second adaptive thresholds based on differences between the first and $N^{th}$ maximum and minimum pixel values; and applying the first and second adaptive thresholds to determine whether a pixel at a center of the specified operation window is a bad pixel.

6. The method of claim 1, wherein:

the bad pixel maps are generated sequentially; and generating the at least one refined bad pixel map comprises refining a subsequent one of the bad pixel maps with an earlier one of the bad pixel maps.

7. The method of claim 1, wherein generating the at least one refined bad pixel map comprises combining bad pixel locations present in all of the bad pixel maps to generate the at least one refined bad pixel map.

8. The method of claim 1, wherein generating the at least one refined bad pixel map comprises:

combining bad pixel locations present in all or a subset of the bad pixel maps to generate an intermediate bad pixel map; and combining bad pixel locations present in the intermediate bad pixel map with bad pixel locations present in an additional bad pixel map, the additional bad pixel map associated with one of the input image frames and based on one or more different adaptive thresholds.

9. The method of claim 1, wherein:

the input image frames are processed in batches; and generating the at least one refined bad pixel map comprises combining a subset of the bad pixel maps associated with a subset of the input image frames.

10. A method comprising:

obtaining multiple input image frames;

generating bad pixel maps associated with different ones of the input image frames, each bad pixel map generated using first and second adaptive thresholds that are based on statistical properties of image data contained in a specified operation window within the associated input image frame;

generating at least one refined bad pixel map using the bad pixel maps associated with two or more of the input image frames; and using one or more coordinates of one or more bad pixels identified in the at least one refined bad pixel map to update one or more pixel values of at least one of the input image frames;

wherein generating the bad pixel maps and generating the at least one refined bad pixel map comprise:

determining the statistical properties of the image data in each of the input image frames;

aggregating the statistical properties to detect a distribution type;

generating the bad pixel maps for at least a subset of the image frames based on the detected distribution type; and combining the bad pixel maps to generate the at least one refined bad pixel map.

11. An electronic device comprising:

at least one imaging sensor configured to capture multiple input image frames; and at least one processing device configured to:

generate bad pixel maps associated with different ones of the input image frames, wherein, to generate each bad pixel map, the at least one processing device is configured to use first and second adaptive thresholds that are based on statistical properties of image data contained in a specified operation window within the associated input image frame;

generate at least one refined bad pixel map using the bad pixel maps associated with two or more of the input image frames; and use one or more coordinates of one or more bad pixels identified in the at least one refined bad pixel map to update one or more pixel values of at least one of the input image frames;

wherein, to generate the bad pixel maps associated with different ones of the input image frames, the at least one processing device is configured, for each of the input image frames, to:

separate the input image frame into multiple color channels;

generate an initial bad pixel map for each of the color channels; and combine the initial bad pixel maps for the color channels to generate the bad pixel map for the input image frame.

12. The electronic device of claim 11, wherein:

the first adaptive threshold is used to identify one or more hot or bright pixels that generate image data that is too bright relative to other pixels in the specified operation window; and the second adaptive threshold is used to identify one or more dark pixels that generate image data that is too dark relative to other pixels in the specified operation window.

13. The electronic device of claim 12, wherein:

the first adaptive threshold has (i) a constant value for a first range of image brightness values and (ii) an increasing value for a second range of image brightness values, the second range larger than the first range; and the second adaptive threshold has (i) a decreasing value for a third range of image brightness values and (ii) a constant value for a fourth range of image brightness values, the third range larger than the fourth range.

14. The electronic device of claim 11, wherein, to generate the initial bad pixel map for each of the color channels, the at least one processing device is configured to:

identify first and $N^{th}$ maximum and minimum pixel values based on pixel values within the specified operation window;

identify the first and second adaptive thresholds based on differences between the first and $N^{th}$ maximum and minimum pixel values; and apply the first and second adaptive thresholds to determine whether a pixel at a center of the specified operation window is a bad pixel.

15. The electronic device of claim 11, wherein:

the at least one processing device is configured to generate the bad pixel maps sequentially; and to generate the at least one refined bad pixel map, the at least one processing device is configured to refine a subsequent one of the bad pixel maps with an earlier one of the bad pixel maps.

16. The electronic device of claim 11, wherein, to generate the at least one refined bad pixel map, the at least one processing device is configured to combine bad pixel locations present in all of the bad pixel maps to generate the at least one refined bad pixel map.

17. The electronic device of claim 11, wherein, to generate the at least one refined bad pixel map, the at least one processing device is configured to:

combine bad pixel locations present in all or a subset of the bad pixel maps to generate an intermediate bad pixel map; and combine bad pixel locations present in the intermediate bad pixel map with bad pixel locations present in an additional bad pixel map, the additional bad pixel map associated with one of the input image frames and based on one or more different adaptive thresholds.

18. The electronic device of claim 11, wherein:

the at least one processing device is configured to process the input image frames in batches; and to generate the at least one refined bad pixel map, the at least one processing device is configured to combine a subset of the bad pixel maps associated with a subset of the input image frames.

19. The electronic device of claim 11, wherein, to generate the bad pixel maps and generate the at least one refined bad pixel map, the at least one processing device is configured to:

determine the statistical properties of the image data in each of the input image frames;

aggregate the statistical properties to detect a distribution type;

generate the bad pixel maps for at least a subset of the image frames based on the detected distribution type; and combine the bad pixel maps to generate the at least one refined bad pixel map.

20. The method of claim 1, wherein generating the bad pixel maps and generating the at least one refined bad pixel map comprise:

determining the statistical properties of the image data in each of the input image frames;

aggregating the statistical properties to detect a distribution type;

generating the bad pixel maps for at least a subset of the image frames based on the detected distribution type; and combining the bad pixel maps to generate the at least one refined bad pixel map.

* * * * *